(12) United States Patent
Sheng et al.

(10) Patent No.: US 11,496,910 B2
(45) Date of Patent: Nov. 8, 2022

(54) ELECTRONIC EQUIPMENT, USER EQUIPMENT, WIRELESS COMMUNICATION METHOD, AND STORAGE MEDIUM

(71) Applicant: Sony Corporation, Tokyo (JP)

(72) Inventors: Bin Sheng, Nanjing (CN); Pingping Xu, Nanjing (CN); Penshun Lu, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 133 days.

(21) Appl. No.: 17/056,028

(22) PCT Filed: Jun. 10, 2019

(86) PCT No.: PCT/CN2019/090460
§ 371 (c)(1),
(2) Date: Nov. 17, 2020

(87) PCT Pub. No.: WO2019/237998
PCT Pub. Date: Dec. 19, 2019

(65) Prior Publication Data
US 2021/0368358 A1    Nov. 25, 2021

(30) Foreign Application Priority Data
Jun. 13, 2018   (CN) .......................... 201810647895.6

(51) Int. Cl.
*H04W 24/10* (2009.01)
*H04W 16/28* (2009.01)
*H04W 64/00* (2009.01)

(52) U.S. Cl.
CPC ........... *H04W 16/28* (2013.01); *H04W 24/10* (2013.01); *H04W 64/006* (2013.01)

(58) Field of Classification Search
CPC ... H04W 16/28; H04W 24/10; H04W 64/006; G01S 5/0036; G01S 5/0273; G01S 5/12;
(Continued)

(56) References Cited

U.S. PATENT DOCUMENTS

2012/0129550 A1* 5/2012 Hannan ................. G01S 5/0221
455/456.1
2012/0258729 A1 10/2012 Siomina et al.
(Continued)

FOREIGN PATENT DOCUMENTS

CN       107318161 A    11/2017
EP         3306337 A1    4/2018
WO   WO-2014008859 A1    1/2014

OTHER PUBLICATIONS

International Search Report and Written Opinion dated Aug. 13, 2019 for PCT/CN2019/090460 filed on Jun. 10, 2019, 9 pages including English Translation of the International Search Report.
(Continued)

*Primary Examiner* — Chuong A Ngo
(74) *Attorney, Agent, or Firm* — Xsensus LLP

(57) ABSTRACT

An electronic equipment, a user equipment, a wireless communication method, and a storage medium. An electronic equipment configured in a wireless communication system that comprises a single base station equipment comprises a processing circuit and is configured to: estimate the distance between a network side equipment and a user equipment according to a downlink signal arrival angle measured by the user equipment and an uplink signal arrival angle measured by the network side equipment; and determine the position of the user equipment according to the distance between the network side equipment and the user equipment as well as the uplink signal arrival angle.

10 Claims, 13 Drawing Sheets

(58) Field of Classification Search
CPC ... G01S 1/08; G01S 3/46; G01S 11/02; G01S 11/04
See application file for complete search history.

(56) References Cited

U.S. PATENT DOCUMENTS

2015/0003338 A1\* 1/2015 Xue .................. H04W 56/0005
370/329
2017/0181010 A1\* 6/2017 Burgess ................ H04W 72/12
2017/0374637 A1 12/2017 Akkarakaran

OTHER PUBLICATIONS

Huawei et al., "Network-based mechanism for millimeter-wave link recovery", 3GPP Tsg Ran WG1 Nr Ad Hoc Meeting, R1-1710473, Jun. 27-30, 2017, Qingdao, China, total 5 pages.
Qualcomm Incorporated, "Beam Reciprocity Aspects", 3GPP Tsg Ran Wg 1 Meeting #87, R1-1612058, Nov. 14-18, 2016, Reno, Nevada, USA, total 11 pages.

\* cited by examiner

ELECTRONIC EQUIPMENT, USER EQUIPMENT, WIRELESS COMMUNICATION METHOD, AND STORAGE MEDIUM

CROSS-REFERENCE TO RELATED APPLICATIONS

The present application is based on PCT filing PCT/CN2019/090460, filed Jun. 10, 2019, which claims priority to Chinese Patent Application No. 201810647895.6, titled "ELECTRONIC EQUIPMENT, USER EQUIPMENT, WIRELESS COMMUNICATION METHOD, AND STORAGE MEDIUM", filed on Jun. 13, 2018 with the Chinese Patent Office each of these applications incorporated herein by reference in their entirety.

FIELD

Embodiments of the present disclosure generally relate to the field of wireless communications, and in particular to an electronic equipment, a user equipment, a wireless communication method, and a computer readable storage medium. More specifically, the present disclosure relates to an electronic equipment that serves as a network side equipment in a wireless communication system, a user equipment in a wireless communication system, a wireless communication method performed by a network side equipment in a wireless communication system, a wireless communication method performed by a user equipment in a wireless communication system, and a computer readable storage medium.

BACKGROUND

There is a method for positioning a user equipment based on a direction of arrival (DOA) or an angle of arrival (AOA). In this method, a user is discovered and the DOA/AOA of the user is measured by beam sweeping. However, angles of departure of sweeping beams are not continuous due to factors such as time delay and complexity, resulting in an error in positioning. In addition, in the positioning based on the DOA/AOA, after the DOA/AOA of the user is estimated, a distance from the user to a network side equipment is also required to be estimated. In the existing method, the distance may be estimated based on reception power. However, the reception power is associated with, in addition to the distance, other factors such as fluctuation of circuitry and absorption of a radio wave by an obstacle. Consequently, there is a certain error in estimating the distance based on the reception power.

Therefore, it is required to propose a technical solution to improve accuracy of positioning the user equipment.

SUMMARY

This part provides a general summary of the disclosure rather than a comprehensive disclosure of the full scope or all features of the disclosure.

An electronic equipment, a user equipment, a wireless communication method, and a computer readable storage medium are provided according to the present disclosure, so as to improve accuracy of positioning the user equipment.

According to an aspect of the present disclosure, an electronic equipment arranged in a wireless communication system including a single base station equipment is provided. The electronic equipment includes processing circuitry, which is configured to: estimate a distance between a network side equipment and a user equipment according to an angle of arrival of a downlink signal measured by the user equipment and an angle of arrival of an uplink signal measured by the network side equipment; and determine a position of the user equipment according to the distance between the network side equipment and the user equipment and the angle of arrival of the uplink signal.

According to another aspect of the present disclosure, a user equipment arranged in a wireless communication system including a single base station equipment is provided. The user equipment includes processing circuitry, which is configured to: measure an angle of arrival of a downlink signal; and transmit the angle of arrival of the downlink signal, for a network side equipment or a base station equipment serving the network side equipment to calculate a distance between the network side equipment and the user equipment according to the angle of arrival of the downlink signal and an angle of arrival of an uplink signal measured by the network side equipment and determine a position of the user equipment according to the distance between the network side equipment and the user equipment and the angle of arrival of the uplink signal.

According to another aspect of the present disclosure, a wireless communication method performed by an electronic equipment is provided. The wireless communication method includes: calculating a distance between a network side equipment and a user equipment according to an angle of arrival of a downlink signal measured by the user equipment and an angle of arrival of an uplink signal measured by the network side equipment; and determining a position of the user equipment according to the distance between the network side equipment and the user equipment and the angle of arrival of the uplink signal.

According to another aspect of the present disclosure, a wireless communication method performed by a user equipment is provided. The wireless communication method includes: measuring an angle of arrival of a downlink signal; and transmitting the angle of arrival of the downlink signal, for a network side equipment or a base station equipment serving the network side equipment to calculate a distance between the network side equipment and the user equipment according to the angle of arrival of the downlink signal and an angle of arrival of an uplink signal measured by the network side equipment and determine a position of the user equipment according to the distance between the network side equipment and the user equipment and the angle of arrival of the uplink signal.

According to another aspect of the present disclosure, a computer readable storage medium is provided. The computer readable storage medium includes executable computer instructions. The executable computer instructions, when executed by a computer, cause the computer to perform the wireless communication method according to the present disclosure.

With the electronic equipment, the wireless communication method, and the computer readable storage medium according to the present disclosure, the user equipment measures the angle of arrival of the downlink signal, and the network side equipment measures the angle of arrival of the uplink signal, so as to estimate the distance between the network side equipment and the user equipment according to the angle of arrival of the downlink signal and the angle of arrival of the uplink signal, thereby positioning the user equipment. In this way, the distance is determined according to the two angles of arrival, so that the determined distance is accurate. Further, the user equipment is positioned according to the determined distance and a true angle of arrival of the uplink signal, so that the user equipment can be positioned accurately.

A further area of applicability becomes apparent from the description provided here. The description and specific examples in this summary are for illustrative purposes only, and are not intended to limit the scope of the present disclosure.

BRIEF DESCRIPTION OF THE DRAWINGS

The drawings described herein are only for illustrating selected embodiments rather than show all possible implementations, and are not intended to limit the scope of the present disclosure. In the drawings.

Figure 1:
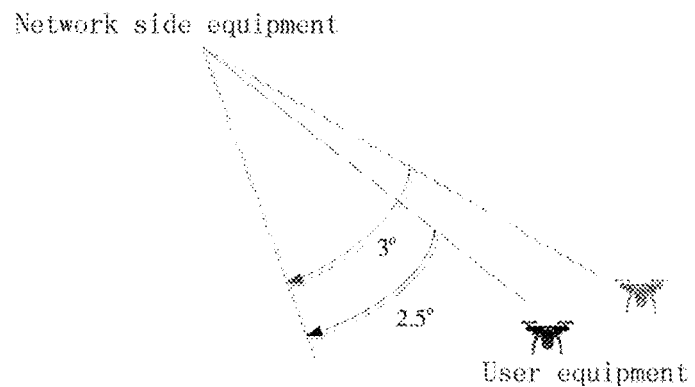
FIG. 1 is a schematic diagram showing that a user equipment is discovered by beam sweeping.

Although the present disclosure is susceptible to various modifications and replacements, specific embodiments thereof have been shown in the drawings as examples and are described in detail herein. It should be understood that the description of specific embodiments herein is not intended to limit the disclosure to the specific forms disclosed. Instead, the present disclosure is intended to cover all modifications, equivalences and replacements within the spirit and the scope of the disclosure. It should be noted that throughout the drawings, corresponding reference numerals represent corresponding components.

DETAILED DESCRIPTION OF EMBODIMENTS

Examples of the present disclosure are described now more fully with reference to the drawings. The following description is merely illustrative in nature, and is not intended to limit the present disclosure, application, or use.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

Exemplary embodiments are described in the following order:

1. Summary
2. Configuration example for a network side equipment;
3. Configuration example for a user equipment;
4. Embodiment of a method;
5. Application example.

1. Summary

FIG. 1 is a schematic diagram showing that a user equipment is discovered by beam sweeping.

As described above, in beam sweeping, angles of sweeping beams are not continuous due to factors such as time delay and implementation complexity. For example, in a case that the angles of sweeping beams are at an interval of 1 degree, angles of departure of the beams only point to 1 degree, 2 degrees, 3 degrees, and so on. However, the user equipment is randomly distributed. As shown in FIG. 1, it is assumed that the user equipment is at a position of 2.5 degrees. Since the beam has a certain width, the user equipment may receive a signal and may perform normal communication. However, in a case that an adopted angle of departure of the beam deviates from the position of the user equipment, for example, 3 degrees as a DOA for the user equipment, an error occurs in positioning. It is assumed that coverage of the network side equipment is a circle with a radius of 50 meters, circumference may be calculated to be 314 meters. Therefore, a distance between centerlines of two adjacent beams on the circumference is about 0.9 meters. If the user equipment is now on a boundary of the coverage, an offset of 0.5 degrees may result in an error of 0.45 meters in positioning.

In addition, as described above, the distance may be estimated based on reception power in the existing method. However, the reception power is associated with, in addition to the distance, other factors such as fluctuation of circuitry and absorption of a radio wave by an obstacle. Consequently, there is a certain error in estimating the distance based on the reception power.

An electronic equipment in a wireless communication system, a user equipment in a wireless communication system, a wireless communication method performed by an electronic equipment in a wireless communication system, a wireless communication method performed by a user equipment in a wireless communication system, and a computer readable storage medium are provided for such a scenario according to the present disclosure, so as to improve the accuracy of positioning the user equipment.

The network side equipment according to the present disclosure may be any type of TRP (Transmit and Receive Port). The TRP is capable of transmitting and receiving. For example, the TRP may receive information from a user equipment and a base station equipment, and may transmit information to the user equipment and the base station equipment. In an example, the TRP may serve the user equipment and is controlled by the base station equipment. That is, the base station equipment serves the user equipment via the TRP. In addition, the network side equipment described in the present disclosure may also be a base station equipment, such as an eNB or a gNB (a base station in a fifth-generation communication system).

The user equipment according to the present disclosure may be a mobile terminal (such as a smartphone, a tablet personal computer (PC), a notebook PC, a portable game terminal, a portable/dongle-type mobile router, and a digital camera) or a vehicle terminal (such as a vehicle navigation equipment). The user equipment may be implemented as a terminal that performs machine-to-machine (M2M) communication (also referred to as a machine type communication (MTC) terminal). In addition, the user equipment may be a wireless communication module (such as an integrated circuitry module including a single wafer) mounted on each of the above terminals.

2. Configuration Example for a Network Side Equipment

Figure 2:
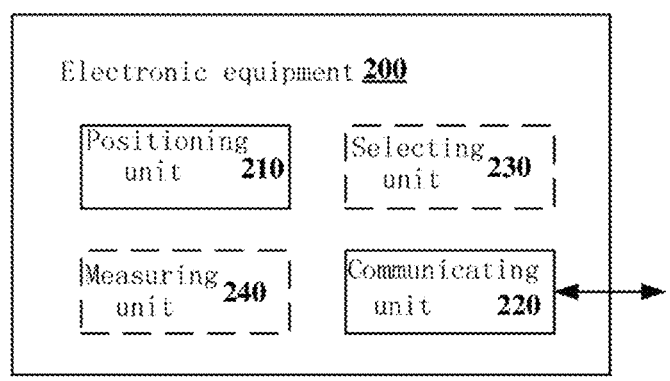
FIG. 2 is a block diagram showing an example of configuration of an electronic equipment according to an embodiment of the present disclosure.

FIG. 2 is a block diagram showing an example of configuration of an electronic equipment 200 according to an embodiment of the present disclosure. The electronic equipment 200 here may serve as a base station equipment or a TRP in a wireless communication system. Further, the electronic equipment 200 may be arranged in a wireless communication system including a single base station equipment.

As shown in FIG. 2, the electronic equipment 200 may include a positioning unit 210 and a communicating unit 220.

Here, each unit of the electronic equipment 200 may be included in processing circuitry. It should be noted that the electronic equipment 200 may include one processing circuitry or multiple processing circuitry. Further, the processing circuitry may include various discrete functional units to perform various functions and/or operations. It should be noted that these functional units may be physical entities or logical entities, and units with different names may be implemented by one physical entity.

According to an embodiment of the present disclosure, the positioning unit 210 is configured to estimate a distance between a network side equipment and a user equipment according to an angle of arrival of a downlink signal measured by the user equipment and an angle of arrival of an uplink signal measured by the network side equipment. For example, the electronic equipment 200 may acquire the angle of arrival of the downlink signal measured by the user equipment via the communicating unit 220. Further, the network side equipment here may be a TRP or a base station equipment, and the electronic equipment 200 may be the network side equipment or may not be the network side equipment. In a case that the electronic equipment 200 is not the network side equipment (for example, the network side equipment is the TRP and the electronic equipment 200 is the base station equipment), the electronic equipment 200 may acquire the angle of arrival of the uplink signal measured by the network side equipment via the communicating unit 220.

According to an embodiment of the present disclosure, the positioning unit 210 is further configured to determine a position of the user equipment according to the distance between the network side equipment and the user equipment and the angle of arrival of the uplink signal.

It can be seen that, the electronic equipment 200 according to the present disclosure may estimate the distance between the network side equipment and the user equipment according to the angle of arrival of the downlink signal and the angle of arrival of the uplink signal, so as to position the user equipment. In this way, the distance is determined according to the two angles of arrival, so that the determined distance is accurate. Further, the user equipment can be positioned according to the determined distance and a true angle of arrival of the uplink signal, so that the user equipment can be positioned accurately.

According to an embodiment of the present disclosure, in a case that the electronic equipment 200 serves as a network side equipment, the electronic equipment 200 may determine the position of the user equipment. In a case that the network side equipment is implemented by a TRP, the electronic equipment 200 may be the TRP or a base station equipment. In a case that the network side equipment is implemented by a base station equipment, the electronic equipment 200 may serve as the base station equipment. That is, the position of the user equipment may be determined by a TRP or a base station equipment. The TRP here may be a TRP around the user equipment, including a TRP that currently serves the user equipment and a TRP that is close to the user equipment but currently does not serve the user equipment. The base station equipment may be a base station equipment that serves the user equipment (or serves the user equipment and the TRP).

According to an embodiment of the present disclosure, the positioning unit 210 is further configured to calculate the distance between the network side equipment and the user equipment according to an angle of transmission of the uplink signal, an angle of transmission of the downlink signal, the angle of arrival of the downlink signal and the angle of arrival of the uplink signal.

According to an embodiment of the present disclosure, the angle of arrival of the downlink signal and the angle of arrival of the uplink signal are associated with a direct path between the user equipment and the network side equipment.

According to an embodiment of the present disclosure, the angle of transmission of the uplink signal is associated with a direction of an uplink transmission beam of the user equipment, and the angle of transmission of the downlink signal is associated with a direction of a downlink transmission beam of the network side equipment.

Figure 3:
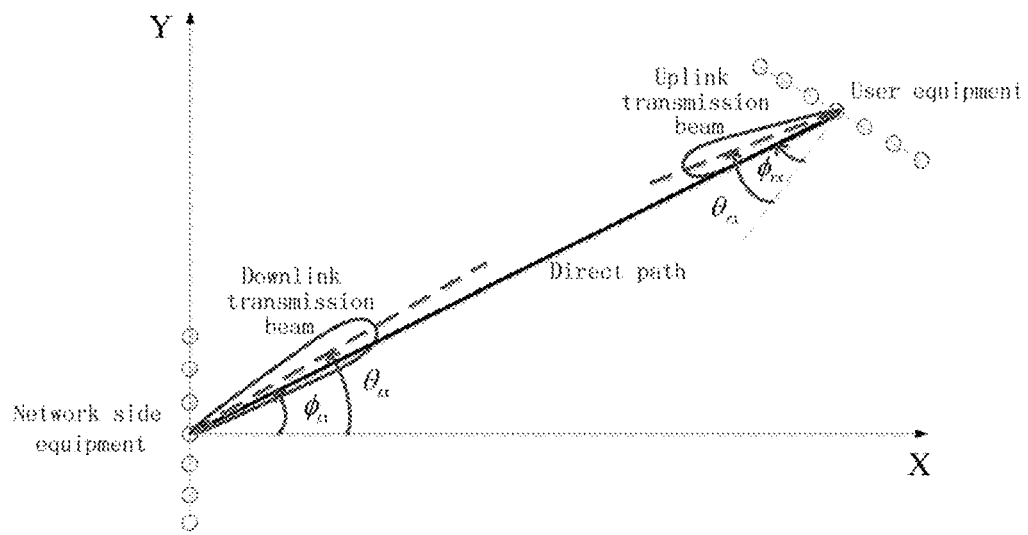
FIG. 3 is a schematic diagram showing a calculation model for positioning a user equipment according to an embodiment of the present disclosure.

FIG. 3 is a schematic diagram showing a calculation model for positioning a user equipment according to an embodiment of the present disclosure.

As shown in FIG. 3, a straight line between the network side equipment and the user equipment represents a direct path between the network side equipment and the user equipment, a dotted line beside the network side equipment represents a direction of the downlink transmission beam, and a dotted line beside the user equipment represents a direction of the uplink transmission beam. In FIG. 3, $\phi_{rx}$ represents an angle of arrival of a downlink signal, which is associated with the direct path between the network side equipment and the user equipment, and specifically represents an angle between a direction of the direct path and a direction perpendicular to an antenna array of the user equipment. $\phi_{tx}$ represents an angle of arrival of a uplink signal, which is associated with the direct path between the network side equipment and the user equipment, and specifically represents an angle between the direction of the direct path and a direction perpendicular to an antenna array of the network side equipment. $\theta_{tx}$ represents an angle of transmission of the downlink signal, which is associated with the direction of the downlink transmission beam of the network side equipment, and specifically represents an angle between the direction of the downlink transmission beam and the direction perpendicular to the antenna array of the network side equipment. $\theta_{rx}$ represents an angle of transmission of the uplink signal, which is associated with the direction of the uplink transmission beam of the user equipment, and specifically represents an angle between the direction of the uplink transmission beam and the direction perpendicular to the antenna array of the user equipment.

According to an embodiment of the present disclosure, the positioning unit 210 may calculate the distance between the network side equipment and the user equipment according to the angle of transmission of the uplink signal $\theta_{rx}$, the angle of transmission of the downlink signal $\theta_{tx}$, the angle of arrival of the downlink signal $\phi_{rx}$ and the angle of arrival of the uplink signal $\phi_{rx}$.

According to an embodiment of the present disclosure, as shown in FIG. 2, the electronic equipment 200 may further include a selecting unit 230, which is configured to select the uplink transmission beam and the downlink transmission beam as shown in FIG. 3. Specifically, the selecting unit 230 may select, from among multiple pairs of beams between the user equipment and the network side equipment, a pair of beams closest to the direct path as the uplink transmission beam and the downlink transmission beam.

According to an embodiment of the present disclosure, in a process of beam sweeping, the network side equipment may transmit a downlink signal by using a specific transmission beam, and the user equipment may receive the downlink signal by using a specific reception beam, so that the transmission beam for the network side equipment and the reception beam for the user equipment may be regarded as a pair of beams. Further, the user equipment may acquire all pairs of beams, and record the all pairs of beams.

According to an embodiment of the present disclosure, the user equipment may further measure a channel quality of each of the all required pairs of beams. Here, the channel quality includes but is not limited to an SIR (Signal to Interference Ratio), an SINR (Signal to Interference plus Noise Ratio), an SNR (Signal Noise Ratio), an RSRP (Reference Signal Receiving Power) and the like.

According to an embodiment of the present disclosure, the electronic equipment 200 may acquire information of the all required pairs of beams from the user equipment. For example, the information includes serial numbers of a transmission beam and a reception beam included in each of these pairs of beams, and channel quality information of each of these pairs of beams.

According to an embodiment of the present disclosure, the selecting unit 230 may select the pair of beams closest to the direct path according to the channel quality of each of the multiple pairs of beams. Specifically, the selecting unit 230 may select a pair of beams with a best channel quality among the multiple pairs of beams as the pair of beams closest to the direct path. Further, the selecting unit 230 may set a channel quality threshold, and select a pair of beams with a channel quality greater than the channel quality threshold and being a best channel quality among the multiple pairs of beams as the pair of beams closest to the direct path.

According to an embodiment of the present disclosure, the electronic equipment 200 may determine a transmission beam with a best quality in a process of transmitting the downlink signal as the downlink transmission beam for the network side equipment, and determine a reception beam with a best quality as the uplink transmission beam for the user equipment. That is, the downlink reception beam for the user equipment may serve as the uplink transmission beam. Therefore, the downlink reception beam and the uplink transmission beam for the user equipment may be implemented by one beam herein. Here, since the direct path is a straight path between the network side equipment and the user equipment without an obstacle, a channel quality of the direct path is the best. Therefore, the electronic equipment 200 may determine the pair of beams closest to the direct path according to the channel quality.

According to an embodiment of the present disclosure, a process of the selecting unit 230 selecting a pair of beams with a channel quality greater than the channel quality threshold and being a best channel quality may be equivalent to a process of determining whether there is a direct path between the network side equipment and the user equipment. That is, a value of the channel quality threshold may be set reasonably, so that it may be determined that there is a direct path between the network side equipment and the user equipment in a case of a pair of beams with a channel quality greater than the channel quality threshold exists, and it may be determined that there is no direct path between the network side equipment and the user equipment in a case of no pair of beams with a channel quality greater than the channel quality threshold exists.

Figure 4:
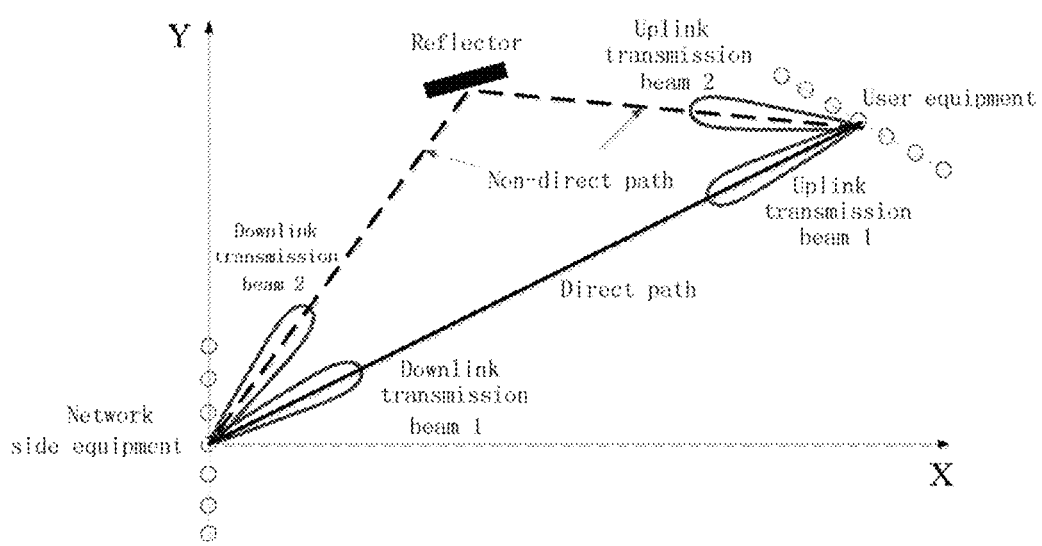
FIG. 4 is a schematic diagram showing a direct path and a non-direct path according to an embodiment of the present disclosure.

FIG. 4 is a schematic diagram showing a direct path and a non-direct path according to an embodiment of the present disclosure. As shown in FIG. 4, the direct path refers to a straight path without an obstacle between the network side equipment and the user equipment, for example, a path between a downlink transmission beam 1 and an uplink transmission beam 1 in FIG. 4. The non-direct path refers to a non-straight path with an obstacle between the network side equipment and the user equipment, for example, a path between a downlink transmission beam 2 and an uplink transmission beam 2 in FIG. 4. That is, in a case of an obstacle between the network side equipment and the user equipment exists, a signal transmitted by a transmission end by using a transmission beam is reflected by a reflector, and then is received by a reception end. Further, the signal may be reflected one or more times before being received by the reception end. A large number of times that the signal is reflected results in a poor quality of the received signal.

According to an embodiment of the present disclosure, the selecting unit 230 may set a channel quality threshold. In a case that a channel quality of a pair of beams is greater than the channel quality threshold, a transmission beam in the pair of beams may be considered to be received by the reception end by using a reception beam in the pair of beams via the direct path. Further, in a case that the selecting unit 230 determines multiple pairs of beams each with a channel quality greater than the channel quality threshold, the selecting unit 230 may select a pair of beams with the best channel quality from the multiple pairs of beams. In addition, in a case that each of the electronic equipment and the network side equipment is the TRP, the base station equipment may set the channel quality threshold, so that the selecting unit 230 may receive the channel quality threshold from the base station equipment.

According to an embodiment of the present disclosure, the selecting unit 230 may determine the channel quality threshold according to coverage of the network side equipment.

Further, the selecting unit 230 may also determine the channel quality threshold according to the coverage of the network side equipment, an antenna gain of the network side equipment, and an antenna gain of the user equipment. An explanation of setting a channel quality threshold according to an embodiment of the present disclosure is provided below.

Preferably, the selecting unit 230 may determine the channel quality threshold A according to the following formula:

$$\Delta = G_t G_r \left( \frac{\lambda}{4\pi R_m} \right)^2 \qquad (1)$$

Here, $G_t$ represents an antenna gain of a network side equipment, $G_r$ represents an antenna gain of the user equipment, $R_m$ represents a radius of the coverage of the network side equipment, and $\lambda$ represents a wavelength of a carrier. Here, $G_r$ may represent an antenna gain of a to-be-positioned user equipment or an average of antenna gains of user equipments within the coverage of the network side equipment.

As described above, after determining the channel quality threshold, the selecting unit 230 may select the pair of beams with a channel quality greater than the channel quality threshold and being a best channel quality among the multiple pairs of beams as the pair of beams closest to the direct path.

According to an embodiment of the present disclosure, since the electronic equipment 200 may serve as a TRP or a base station equipment, the TRP or the base station equipment may select the pair of beams closest to the direct path.

Figure 5:
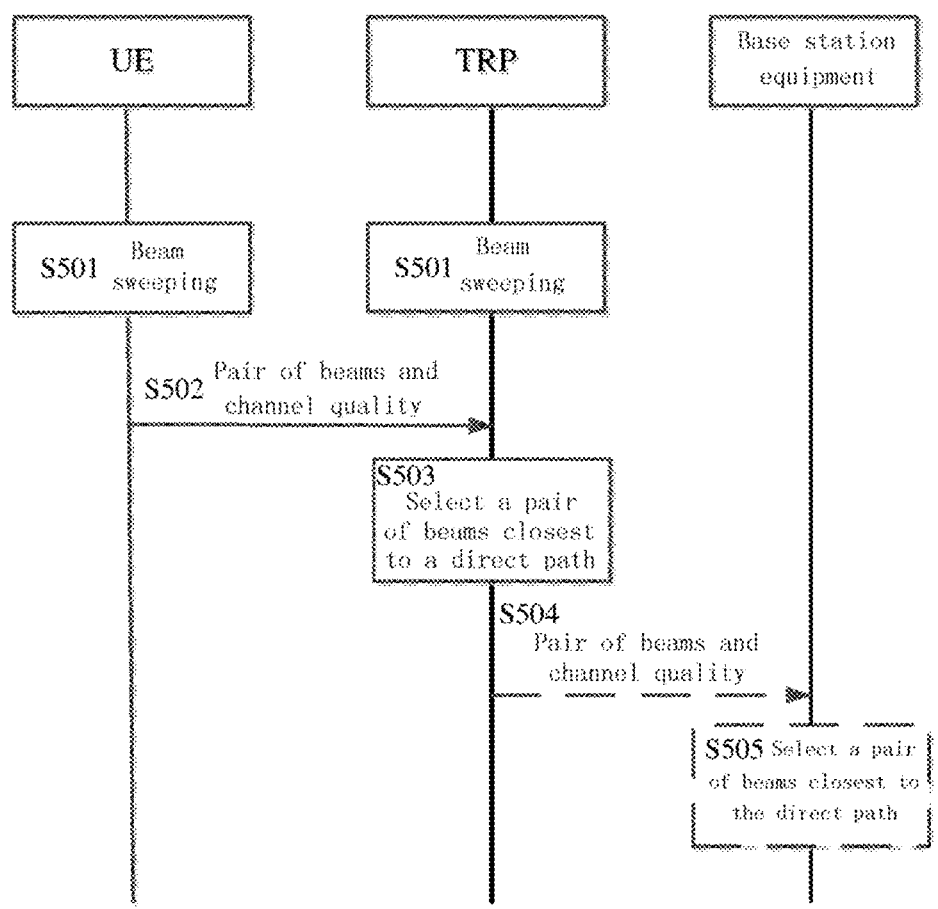
FIG. 5 is a flowchart showing signaling for selecting a pair of beams closest to the direct path according to an embodiment of the present disclosure.

FIG. 5 is a flowchart showing signaling for selecting a pair of beams closest to the direct path according to an embodiment of the present disclosure. As shown in FIG. 5, in step S501, a TRP and a UE both perform beam sweeping, so that the UE acquires all pairs of beams and a channel quality of each of the all pairs of beams. Next, in step S502, the UE transmits these pairs of beams and channel quality information of these pairs of beams to the TRP. Next, in step S503, the TRP selects a pair of beams closest to the direct path according to the channel quality information of these pairs of beams. Alternatively, the base station equipment may select a pair of beams closest to the direct path. Therefore, optionally, in step S504, the TRP may transmit these pairs of beams and channel quality information of these pairs of beams to the base station equipment. Next, in step S505, the base station equipment selects the pair of beams closest to the direct path according to the channel quality information of these pairs of beams.

According to an embodiment of the present disclosure, the electronic equipment 200 may transmit information of the pair of beams closest to the direct path to the network side equipment and the user equipment via the communicating unit 220. Here, in a case that the electronic equipment 200 serves as the network side equipment, the electronic equipment 200 transmits the information of the pair of beams closest to the direct path to the user equipment only. For example, the electronic equipment 200 may carry the uplink transmission beam for the user equipment and the downlink transmission beam for the network side equipment by a positioning instruction message.

Further, the positioning instruction message transmitted by the electronic equipment 200 may include a positioning start time and/or positioning duration. Here, the positioning duration may represent a time period for the network side equipment and the user equipment to acquire parameters required for positioning, and the positioning start time may represent a start time instant of the positioning duration. Further, the positioning duration may include first positioning duration and second positioning duration. The first positioning duration may represent a time period for the network side equipment to acquire the parameters required for positioning. The second positioning duration may represent a time period for the user equipment to acquire the parameters required for positioning. Further, the first positioning duration may be a time period for performing uplink transmission. In the first positioning duration, the user equipment transmits an uplink signal by using the above determined uplink transmission beam, and the network side equipment does not generate a reception beam and acquires the parameters required for positioning. Similarly, the second positioning duration may be a time period for performing downlink transmission. In the second positioning duration, the network side equipment transmits a downlink signal by using the above determined downlink transmission beam, and the user equipment does not generate a reception beam and acquires the parameters required for positioning.

According to an embodiment of the present disclosure, in a case that the electronic equipment 200 serves as the network side equipment, the electronic equipment 200 may measure an angle of arrival of an uplink signal, that is, $\phi_{tx}$ shown in FIG. 3, and may receive an angle of arrival of a downlink signal measured by the user equipment from the user equipment, that is, $\phi_{rx}$ shown in FIG. 3.

Specifically, in the first positioning duration, the electronic equipment 200 may receive the uplink signal transmitted by using the uplink transmission beam from the user equipment via the communicating unit 220. Further, in the first positioning duration, the electronic equipment 200 does not generate a reception beam. That is, the electronic equipment 200 omnidirectionally receives the uplink signal from the user equipment.

According to an embodiment of the present disclosure, as shown in FIG. 2, the electronic equipment 200 may further include a measuring unit 240, which is configured to measure an angle of arrival of the uplink signal in the first positioning duration. Further, the measuring unit 240 may measure the angle of arrival of the uplink signal according to uplink signals received by different antennas of the electronic equipment 200.

In the first positioning duration, a transmission beamforming vector generated by the user equipment is expressed as:

$$w^*(\theta_{rx}) = \frac{1}{\sqrt{N_{rx}}} \left[ 1, e^{j\pi \sin(\theta_{rx})}, \ldots, e^{-j\pi(N_{rx}-1)\sin(\theta_{rx})} \right]^T \qquad (2)$$

Here, $N_{rx}$ represents the number of antennas of the user equipment, $\theta_{rx}$ represents an angle of transmission of a uplink signal determined according to a direction of a uplink transmission beam, and $[\ ]^T$ represents a transpose of a matrix.

The network side equipment does not generate a reception beam, and a signal received by the network side equipment is expressed as:

$$y(t)=\sqrt{P_u}H^T w^*(\theta_{rx})s(t)+n_u \quad (3)$$

Here, $P_u$ represents uplink transmission power of the user equipment, H represents a downlink channel matrix between the user equipment and the network side equipment, $H^T$ represents a transpose of the downlink channel matrix, $w^*(\theta_{rx})$ represents the transmission beamforming vector obtained from the above formula (2), s(t) represents a positioning signal, and $n_u$ represents noise. Here, it is assumed that noise is not considered, the above formula may be transformed into:

$$y(t) = \begin{bmatrix} y_0(t) \\ y_1(t) \\ \dots \\ y_{N_{tx}-1}(t) \end{bmatrix} = h a_{tx}(\phi_{tx}) = h\left[1,\ e^{j\pi\sin(\phi_{tx})},\ \dots\ ,\ e^{j\pi(N_{tx}-1)\sin(\phi_{tx})}\right]^T \quad (4)$$

Here, $N_{tx}$ represents the number of antennas of the network side equipment, $y_0(t), y_1(t), \dots, T_{N_{tx}-1}(t)$ represent signals received by the antennas of the network side equipment respectively, $\phi_{tx}$ represents an to-be-measured angle of arrival of a uplink signal, h may be expressed as:

$$h = a_{rx}^T(\phi_{rx}) \cdot w^*(\theta_{rx}) \frac{\sqrt{P_u}\,\alpha s(t)}{\sqrt{N_{tx}}},$$

$a_{tx}(\phi_{tx})$ represents a steering vector, $a_{rx}(\phi_{rx})$ represents a response vector, $\alpha$ represents a complex channel parameter between the user equipment and the network side equipment, $P_u$ represents uplink transmission power of the user equipment, and $w^*(\theta_{rx})$ represents the transmission beamforming vector obtained from the above formula (2), s(t) represents a positioning signal, and $[\ ]^T$ represents a transpose of a matrix.

The steering vector represents a portion associated with the angle of arrival of the uplink signal in a channel matrix between the user equipment and the network side equipment. Specifically, a channel matrix H between the user equipment and the network side equipment may be expressed as:

$$H=\alpha a_{rx}(\phi_{rx})a_{tx}^H(\phi_{tx}) \quad (5)$$

Here, $a_{tx}(\phi_{tx})$ represents a steering vector, and $[\ ]^H$ represents a conjugate transpose of the matrix. The steering vector represents a portion in H that is associated with the angle of arrival of the uplink signal and may be expressed as:

$$a_{tx}(\phi_{tx}) = \frac{1}{\sqrt{N_{tx}}}\left[1,\ e^{j\pi\sin(\phi_{tx})},\ \dots\ ,\ e^{j\pi(N_{tx}-1)\sin(\phi_{tx})}\right]^T \quad (6)$$

Here, $N_{tx}$ represents the number of antennas of the network side equipment, and $\phi_{tx}$ represents an angle of arrival of an uplink signal.

$a_{rx}(\phi_{rx})$ represents a response vector, that is, a portion in H that is associated with the angle of arrival of the downlink signal, and may be expressed as:

$$a_{rx}(\phi_{rx}) = \frac{1}{\sqrt{N_{rx}}}\left[1,\ e^{j\pi\sin(\phi_{rx})},\ \dots\ ,\ e^{j\pi(N_{rx}-1)\sin(\phi_{rx})}\right]^T \quad (7)$$

Here, $N_{rx}$ represents the number of antennas of the user equipment, $\phi_{rx}$ represents an angle of arrival of a downlink signal, and $[\ ]^T$ represents a transpose of a matrix.

Here, $\alpha$ represents a complex channel parameter of the direct path between the user equipment and the network side equipment, and represents a portion rather than the portion associated with the angle of arrival of the uplink signal and the portion associated with the angle of arrival of the downlink signal in the channel matrix.

According to an embodiment of the present disclosure, the measuring unit 240 may measure the angle of arrival of the uplink signal according to the uplink signals received by different antennas of the electronic equipment 200. For example, the measuring unit 240 may determine the angle of arrival of the uplink signal based on an uplink signal received by an antenna 1 and an uplink signal received by an antenna 0. That is, a second element y J0 in formula (4) is divided by a first element $y_0(t)$ in formula (4).

$$z = \frac{y_1(t)}{y_0(t)} = \frac{h}{h}e^{j\pi\sin(\phi_{tx})} = e^{j\pi\sin(\phi_{tx})} \quad (8)$$

Here, the measuring unit 240 may calculate the angle of arrival of the uplink signal $\phi_{tx}$ according to a phase angle of z in formula (8).

Further, the measuring unit 240 may also measure the angle of arrival of the uplink signal according to uplink signals received by all antennas. For example, z may be calculated from the following formula, and the angle of arrival of the uplink signal $\phi_{tx}$ may be calculated according to the phase angle of z.

$$z = \frac{\sum_{i=0}^{N_{tx}/2-1} \frac{y_{N_{tx}/2+i}(t)}{y_i(t)}}{N_{tx}/2} \quad (9)$$

The network side equipment may not generate a reception beam, and record an uplink signal received by each antenna, and then measure the angle of arrival of the uplink signal $\phi_{tx}$ according to the uplink signals received by different antennas of the network side equipment.

According to an embodiment of the present disclosure, in the second positioning duration, the network side equipment may transmit a downlink signal to the user equipment by using the above determined downlink transmission beam, and may receive an angle of arrival of the downlink signal measured by the user equipment.

According to an embodiment of the present disclosure, in the second positioning duration, the user equipment does not generate a reception beam. That is, the user equipment omnidirectionally receives the downlink signal from the network side equipment. Further, the user equipment may also measure the angle of arrival of the downlink signal according to the downlink signals received by different antennas.

A transmission beamforming vector generated by the network side equipment is expressed as:

$$f(\theta_{tx}) = \frac{1}{\sqrt{N_{tx}}}\left[1, e^{j\pi \sin(\theta_{tx})}, \ldots, e^{j\pi(N_{tx}-1)\sin(\theta_{tx})}\right]^T \quad (10)$$

Here, $N_{tx}$ represents the number of antennas of the network side equipment, $\theta_{tx}$ represents an angle of transmission of a downlink signal determined according to a direction of the downlink transmission beam, and $[\ ]^T$ represents a transpose of a matrix.

The user equipment does not generate a reception beam, and a signal received by the user equipment is expressed as:

$$y(t) = \sqrt{P_d} H f(\theta_{tx}) s(t) + n_d \quad (11)$$

Here, $P_d$ represents downlink transmission power of the network side equipment, H represents a downlink channel matrix between the user equipment and the network side equipment, $f(\theta_{tx})$ represents the transmission beamforming vector obtained from formula (10), s(t) represents a positioning signal, and $n_d$ indicates noise. Here, it is assumed that noise is not considered, the above formula may be transformed into:

$$y(t) = \begin{bmatrix} y_0(t) \\ y_1(t) \\ \ldots \\ y_{N_{tx}-1}(t) \end{bmatrix} = h a_{rx}(\phi_{rx}) = h\left[1, e^{j\pi\sin(\phi_{tx})}, \ldots, e^{j\pi(N_{tx}-1)\sin(\phi_{tx})}\right]^T \quad (12)$$

Here, $N_{rx}$ represents the number of antennas of the user equipment, $y_0(t), y_1(t), \ldots, y_{N_{rx}-1}(t)$ represents signals received by antennas of the user equipment respectively, and $\phi_{rx}$ represents an to-be-measured angle of arrival of a downlink signal, $[\ ]^T$ represents a transpose of a matrix, h may be expressed as:

$$h = a_{tx}(\phi_{tx}) \cdot f \frac{\sqrt{P_d}\alpha s(t)}{\sqrt{N_{rx}}},$$

$a_{tx}(\phi_{tx})$ presents a steering vector, $a_{rx}(\phi_{rx})$ represents a response vector, a represents a complex channel parameter between the user equipment and the network side equipment, $P_d$ represents downlink transmission power of the network side equipment, f represents the transmission beamforming vector obtained from formula (10), and s(t) represents a positioning signal.

Similarly, the user equipment may measure the angle of arrival of the uplink signal based on uplink signals received by different antennas of the user equipment. For example, the user equipment may determine the angle of arrival of the uplink signal based on an uplink signal received by an antenna 1 and an uplink signal received by an antenna 0. That is, a second element $y_1(t)$ in formula (12) is divided by a first element $y_0(t)$ in formula (12).

$$z = \frac{y_1(t)}{y_0(t)} = \frac{h}{h} e^{j\pi\sin(\phi_{rx})} = e^{j\pi\sin(\phi_{rx})} \quad (13)$$

Here, the user equipment may calculate the angle of arrival of the downlink signal $\phi_{rx}$ according to a phase angle of z. that is, the user equipment may not generate a reception beam and record the downlink signal received by each antenna. Then, the user equipment may measure the angle of arrival of the downlink signal according to the downlink signals received by different antennas of the user equipment.

As described above, according to an embodiment of the present disclosure, in a case that the electronic equipment 200 serves as a network side equipment (for example, the electronic equipment 200 and the network side equipment are both TRPs, or the electronic equipment 200 and the network side equipment are both base station equipments), the electronic equipment 200 may measure the angle of arrival of the uplink signal, that is, $\phi_{tx}$ shown in FIG. 3, and may receive the angle of arrival of the downlink signal measured by the user equipment, that is, $\phi_{rx}$ shown in FIG. 3, from the user equipment. In addition, the electronic equipment 200 may determine the angle of transmission of the downlink signal $\theta_{tx}$ according to the direction of the downlink transmission beam, and may determine the angle of transmission of the uplink signal $\theta_{rx}$ according to the direction of the uplink transmission beam. In this way, the electronic equipment 200 may acquire the angle of arrival of the uplink signal $\phi_{tx}$, the angle of arrival of the downlink signal $\phi_{rx}$, the angle of transmission of the downlink signal $\theta_{tx}$, and the angle of transmission of the uplink signal $\theta_{rx}$, so as to calculate the distance between the network side equipment and the user equipment according to information of these angles.

According to an embodiment of the present disclosure, in a case that the electronic equipment 200 serves as a base station equipment, and the network side equipment is implemented by, for example, a TRP, the electronic equipment 200 may receive the angle of arrival of the downlink signal $\phi_{rx}$ measured by the user equipment from the user equipment, and may receive the angle of arrival of the uplink signal $\phi_{tx}$ measured by the network side equipment from the network side equipment. A manner in which the user equipment measures the angle of arrival of the downlink signal and a manner in which the network side equipment measures the angle of arrival of the uplink signal are described in detail in the foregoing, and are not repeated here. Similarly, the electronic equipment 200 may determine the angle of transmission of the downlink signal $\theta_{tx}$ according to the direction of the downlink transmission beam, and may determine the angle of transmission of the uplink signal $\theta_{rx}$ according to the direction of the uplink transmission beam, so as to calculate the distance between the network side equipment and the user equipment according to information of these angles.

Next, calculation of the distance between the network side equipment and the user equipment performed by the positioning unit 210 is described in detail.

In a process of beam sweeping, a pair of beams may be generated between the network side equipment and the user equipment. That is, the network side equipment may transmit a downlink signal by using a specific transmission beam, and the user equipment may receive the downlink signal by using a specific reception beam, so that the transmission beam for the network side equipment and the reception beam for the user equipment may be regarded as a pair of beams. In this process, a transmission beamforming vector generated by the network side equipment is expressed as:

$$f(\theta_{tx}) = \frac{1}{\sqrt{N_{tx}}}\left[1, e^{j\pi\sin(\theta_{tx})}, \ldots, e^{j\pi(N_{tx}-1)\sin(\theta_{tx})}\right]^T \quad (14)$$

Here, $N_{tx}$ represents the number of antennas of the network side equipment, $\theta_{tx}$ represents an angle of transmission of the downlink signal determined according to the direction of the downlink transmission beam, and $[\ ]^T$ represents a transpose of a matrix.

A transmission beamforming vector generated by the user equipment is expressed as:

$$w(\theta_{rx}) = \frac{1}{\sqrt{N_{rx}}}\left[1, e^{j\pi sin(\theta_{rx})}, \ldots, e^{j\pi(N_{rx}-1)sin(\theta_{rx})}\right]^T \quad (15)$$

Here, $N_{rx}$ represents the number of antennas of the user equipment, $\theta_{rx}$ represents an angle of transmission of the uplink signal determined according to a direction of a downlink reception beam (that is, the direction of the uplink transmission beam), and $[\ ]^T$ represents a transpose of a matrix.

Further, the downlink signal received by the user equipment may be expressed as:

$$y_d(t)=\sqrt{P_d}w^H(\theta_{rx})Hf(\theta_{tx})s(t)+w^H n_d(t) \quad (16)$$

Here, $P_d$ represents downlink transmission power of the network side equipment, $w^H$ and $w^H(\theta_{rx})$ each represent a transpose of the reception beamforming vector calculated from formula (15), H represents a downlink channel matrix between the user equipment and the network side equipment, $f(\theta_{tx})$ represents a transmission beamforming vector of the network side equipment, $s(t)$ represents a positioning signal, and $n_d(t)$ represents noise. Here, it is assumed that noise is not considered, and $s(t)=1$ and $P_d=1$, the above formula may be transformed into:

$$y_d(t)=w^H(\theta_{rx})Hf(\theta_{tx}) \quad (17)$$

Here, an expression of H in formula (5) is substituted into formula (17) to obtain the following formula:

$$y_d(t)=\alpha w^H(\theta_{rx})a_{rx}(\phi_{rx})a_{tx}^H(\phi_{tx})f(\theta_{tx}) \quad (18)$$

According to an embodiment of the present disclosure, it is set that:

$$\beta=a_{tx}^H(\phi_{tx})f(\theta_{tx}) \quad (19)$$

$$\gamma=w^H(\theta_{rx})a_{rx}(\phi_{rx}) \quad (20)$$

According to an embodiment of the present disclosure, $\beta$ represents an error (hereinafter referred to as a second error) between the direction of the downlink transmission beam and the direction of the direct path. That is, $\beta$ represents an error in the received downlink signal resulted from mismatch between the transmission beamforming vector $f(\theta_{tx})$ and the steering vector $a_{tx}(\phi_{tx})$ due to a case of $\theta_{tx}\neq\phi_{tx}$.

According to an embodiment of the present disclosure, $\gamma$ represents an error (hereinafter referred to as a first error) between the direction of the uplink transmission beam and the direction of the direct path. That is, $\gamma$ represents an error in the received downlink signal resulted from mismatch between the reception beamforming vector $w(\theta_{rx})$ and the response vector $a_{rx}(\phi_{rx})$ due to a case of $\theta_{rx}\neq\phi_{rx}$.

Further, formula (6) and formula (14) are substituted into formula (19) to obtain the following formula:

$$\beta = \frac{1}{N_{tx}}\left[1\ e^{-j\pi sin(\phi_{tx})}\ \ldots\ e^{-j\pi(N_{tx}-1)sin(\phi_{tx})}\right]\begin{bmatrix}1\\e^{j\pi sin(\theta_{tx})}\\\ldots\\e^{j\pi(N_{tx}-1)sin(\theta_{tx})}\end{bmatrix} \quad (21)$$

Here, $N_{tx}$ represents the number of antennas of the network side equipment, $\theta_{tx}$ represents an angle of transmission of the downlink signal, and $\phi_{tx}$ represents an angle of arrival of the uplink signal.

Further, formula (7) and formula (15) are substituted into formula (20) to obtain the following formula:

$$\gamma = \frac{1}{N_{rx}}\left[1\ e^{-j\pi sin(\theta_{rx})}\ \ldots\ e^{-j\pi(N_{rx}-1)sin(\phi_{rx})}\right]\begin{bmatrix}1\\e^{j\pi sin(\phi_{rx})}\\\ldots\\e^{j\pi(N_{rx}-1)sin(\phi_{rx})}\end{bmatrix} \quad (22)$$

Here, $N_{rx}$ represents the number of antennas of the user equipment, $\theta_{rx}$ represents an angle of transmission of the uplink signal, and $\phi_{rx}$ represents an angle of arrival of the downlink signal.

It is assumed that there is neither first error nor second error, that is, $\theta_{tx}=\phi_{tx}$ and $\theta_{rx}=\phi_{rx}$. Therefore, $\beta$ and $\gamma$ are both equal to 1, that is, $\gamma=\beta=1$. Further, formula (18) may be transformed into:

$$y_d(t)=\alpha=|\alpha|e^{j\varphi} \quad (23)$$

Here, $|\alpha|$ represents a modulus of a complex channel parameter, and $\varphi$ represents a phase angle of the complex channel parameter.

In this case, the complex channel parameter may be determined according to the received downlink signal, so as to calculate the distance between the network side equipment and the user equipment according to the modulus or phase angle of the complex channel parameter. However, due to presence of the first error and the second error, influence due to the first error and the second error on the received downlink signal is required to be removed so as to accurately calculate the complex channel parameter, thereby calculating the distance between the network side equipment and the user equipment.

The embodiments of the present disclosure adopt the above principle. The first error and the second error are calculated according to the angle of arrival of the uplink signal, the angle of arrival of the downlink signal, the angle of transmission of the uplink signal, and the angle of transmission of the downlink signal. Then, the influence due to the first error and the second error is removed from the received downlink signal, so as to calculate the complex channel parameter, thereby calculating the distance between the network side equipment and the user equipment according to the complex channel parameter.

According to an embodiment of the present disclosure, the positioning unit 210 may calculate the first error $\gamma$ between the direction of the uplink transmission beam and the direction of the direct path between the user equipment and the network side equipment according to the angle of transmission of the uplink signal $\theta_{rx}$ and the angle of arrival of the downlink signal $\phi_{rx}$.

It can be seen from formula (20) that the first error $\gamma$ is associated with the downlink reception beamforming vector $w(\theta_{rx})$ and the response vector $a_{rx}(\phi_{rx})$. That is, the first error $\gamma$ may be calculated according to the downlink reception beamforming vector $w(\theta rx)$ and the response vector $a_{rx}(\phi_{rx})$ (for example, from formula (20)). It can be seen from formula (15) that the downlink reception beamforming vector $w(\theta_{rx})$ is associated with the angle of transmission of the uplink signal $\theta_{rx}$. That is, the downlink reception beamforming vector $w(\theta_{rx})$ may be calculated according to the angle of transmission of the uplink signal $\theta_{rx}$ (for example, from formula (15)). It can be seen from formula (7) that the response vector $a_{rx}(\phi_{rx})$ is associated with the angle of arrival of the downlink signal $\phi_{rx}$. That is, the response vector $a_{rx}(\phi_{rx})$ of the downlink channel matrix of the direct path may be calculated according to the angle of arrival of the downlink signal $\phi_{rx}$ (for example, from formula (7)).

As described above, according to the embodiment of the present disclosure, the positioning unit 210 may calculate the downlink reception beamforming vector according to the angle of transmission of the uplink signal, calculate the response vector of the downlink channel matrix of the direct path according to the angle of arrival of the downlink signal, and calculate the first error according to the downlink reception beamforming vector and the response vector. The response vector represents a portion in the downlink channel matrix which is associated with the angle of arrival of the downlink signal.

That is, an estimated value $\hat{\gamma}$ of the first error $\gamma$ may be calculated from the following formula:

$$\hat{\gamma} = \frac{1}{N_{rx}}\begin{bmatrix} 1 & e^{-j\pi \sin(\theta_{rx})} & \cdots & e^{-j\pi(N_{rx}-1)\sin(\theta_{rx})} \end{bmatrix} \begin{bmatrix} 1 \\ e^{j\pi \sin(\hat{\phi}_{rx})} \\ \cdots \\ e^{j\pi(N_{rx}-1)\sin(\hat{\phi}_{rx})} \end{bmatrix} \quad (24)$$

Here, $\hat{\phi}_{rx}$ represents a measured value of $\phi_{rx}$, that is, a value of the angle of arrival of the downlink signal measured by the user equipment, $\theta_{rx}$ represents an angle of transmission of the uplink signal, and $N_{rx}$ represents the number of antennas of the user equipment.

Further, according to an embodiment of the present disclosure, the positioning unit 210 may calculate the second error 13 between the direction of the downlink transmission beam and the direction of the direct path according to the angle of transmission of the downlink signal $\theta_{tx}$ and the angle of arrival of the uplink signal $\phi_{tx}$.

It can be seen from formula (19) that the second error $\beta$ is associated with the downlink transmission beamforming vector $f(\theta_{tx})$ and the steering vector $a_{tx}(\phi_{tx})$. That is, the second error $\beta$ may be calculated according to the downlink transmission beamforming vector $f(\theta_{tx})$ and the steering vector $a_{tx}(\phi_{tx})$ (for example, from formula (19)). The steering vector represents a portion in the downlink channel matrix which is associated with the angle of arrival of the uplink signal. It can be seen from formula (14) that the downlink transmission beamforming vector $f(\theta_{tx})$ is associated with the angle of transmission of the downlink signal $\theta_{tx}$. That is, the downlink transmission beamforming vector $f(\theta_{tx})$ may be calculated according to the angle of transmission of the downlink signal $\theta_{tx}$ (for example, from formula (14)). It can be seen from formula (6) that the steering vector $a_{tx}(\phi_{tx})$ is associated with the angle of arrival of the uplink signal $\phi_{tx}$. That is, the steering vector $a_{tx}(\phi_{tx})$ of the downlink channel matrix of the direct path may be calculated according to the angle of arrival of the uplink signal $\phi_{tx}$ (for example, from formula (6)).

As described above, according to an embodiment of the present disclosure, the positioning unit 210 may calculate the downlink transmission beamforming vector $f(\theta_{tx})$ according to the angle of transmission of the downlink signal, calculate the steering vector $a_{tx}(\phi_{tx})$ of the downlink channel matrix of the direct path according to the angle of arrival of the uplink signal, and calculate the second error $\beta$ according to the downlink transmission beamforming vector $f(\theta_{tx})$ and the steering vector $a_{tx}(\phi_{tx})$. The steering vector represents the portion in the downlink channel matrix which is associated with the angle of arrival of the uplink signal.

That is, an estimated value $\hat{\beta}$ of the second error $\beta$ may be calculated from the following formula:

$$\hat{\beta} = \frac{1}{N_{tx}}\begin{bmatrix} 1 & e^{-j\pi \sin(\hat{\phi}_{tx})} & \cdots & e^{-j\pi(N_{tx}-1)\sin(\hat{\phi}_{tx})} \end{bmatrix} \begin{bmatrix} 1 \\ e^{j\pi \sin(\theta_{tx})} \\ \cdots \\ e^{j\pi(N_{tx}-1)\sin(\theta_{tx})} \end{bmatrix} \quad (25)$$

Here, $\hat{\phi}_{tx}$ represents a measured value of $\phi_{tx}$, that is, a value of the angle of arrival of the uplink signal measured by the network side equipment, $\theta_{tx}$ represents an angle of transmission of the downlink signal, and $N_{tx}$ represents the number of antennas of the network side equipment.

It should be noted that a symbol "$\hat{x}$" herein is used to represent an estimated value, a calculated value or a measured value of a parameter "x", is not essentially different from the parameter "x", and is only used to indicate that the parameter is estimated, calculated or measured.

According to an embodiment of the present disclosure, after calculating the estimated value $\hat{\gamma}$ of the first error $\gamma$ and the estimated value $\hat{\beta}$ of the second error $\beta$ as described above, the positioning unit 210 may calculate the distance between the network side equipment and user equipment according to the first error and the second error.

According to an embodiment of the present disclosure, the positioning unit 210 may acquire the complex channel parameter of the direct path according to the first error and the second error, and then calculate the distance between the network side equipment and the user equipment according to the complex channel parameter of the direct path.

It can be seen from formula (23) that, the complex channel parameter of the direct path may be represented by the received downlink signal in case that the first error and the second error do not exist. Therefore, according to an embodiment of the present disclosure, in the presence of the first error and the second error, the influence due to the first error and the second error is required to be removed from the received downlink signal, so as to acquire an accurate complex channel parameter. Specifically, according to an embodiment of the present disclosure, the positioning unit 210 may divide the received downlink signal by a product of the first error and the second error, to acquire the complex channel parameter. That is, the positioning unit 210 may calculate the complex channel parameter a from the following formula:

$$\alpha = \frac{y_d(t)}{\hat{\beta}\hat{\gamma}} = |\alpha|e^{j\varphi} \quad (26)$$

Here, $\hat{\gamma}$ and $\hat{\beta}$ respectively represent values of the first error and the second error calculated by the positioning unit 210, and $y_d(t)$ represents a downlink signal received by the user equipment. According to an embodiment of the present disclosure, in the process of beam sweeping, the user equipment may store not only the pairs of beams and the channel quality information of these pairs of beams but also a value of the received downlink signal. Further, the user equipment may transmit the value of the received downlink signal to an apparatus that determines the distance between the user equipment and the network side equipment, such as the network side equipment or a base station equipment that serves the network side equipment.

In formula (26), $|\alpha|$ represents a modulus of the complex channel parameter, and $\varphi$ represents a phase angle of the complex channel parameter.

According to an embodiment of the present disclosure, the modulus of the complex channel parameter may be calculated from the following formula:

$$|\alpha|^2 = G_t G_r \left(\frac{\pi}{4\pi R}\right)^2 \tag{27}$$

Here, $G_t$ and $G_r$ respectively represent antenna gains of the network side equipment and the user equipment, $\lambda$ represents a wavelength of a carrier, and R represents a to-be-calculated distance between the network side equipment and the user equipment.

Further, according to an embodiment of the present disclosure, the phase angle of the complex channel parameter may be calculated from the following formula:

$$\varphi = 2n\pi + \psi = \frac{2\pi}{\lambda} R \tag{28}$$

Here, $\lambda$ represents a wavelength of a carrier, R represents a to-be-calculated distance between the network side equipment and the user equipment, n is a natural number, and $\psi < 2\pi$.

According to an embodiment of the present disclosure, the positioning unit 210 may calculate the distance between the network side equipment and the user equipment according to the complex channel parameter of the direct path. For example, after calculating the complex channel parameter, the positioning unit 210 may calculate the modulus and the phase angle of the complex channel parameter, so as to calculate the distance between the network side equipment and the user equipment according to the modulus or phase angle of the complex channel parameter.

For example, the positioning unit 210 may calculate the distance between the network side equipment and the user equipment according to the modulus of the complex channel parameter. For example, in a case that $G_t$, $G_r$, $\lambda$, and $|\alpha|$ are known, R may be calculated from formula (27).

For another example, the positioning unit 210 may calculate the distance between the network side equipment and the user equipment according to the phase angle of the complex channel parameter. As shown in formula (28), since n is unknown, the distance between the network side equipment and the user equipment may be calculated according to a phase difference between complex channel parameters.

As described above, according to the embodiment of the present disclosure, in the first positioning duration, the network side equipment may receive the uplink signal transmitted by using the uplink transmission beam (that is, a known angle of transmission of the uplink signal) from the user equipment. Further, in the first positioning duration, the network side equipment does not generate a reception beam. That, is, the network side equipment omnidirectionally receives the uplink signal from the user equipment, so as to measure the angle of arrival of the uplink signal. Further, in the second positioning duration, the user equipment may receive the downlink signal transmitted by using a downlink transmission beam (that is, a known angle of transmission of the downlink signal) from the network side equipment. Further, in the second positioning duration, the user equipment does not generate a reception beam. That is, the user equipment omnidirectionally receives the downlink signal from the network side equipment, so as to measure the angle of arrival of the downlink signal. Further, the positioning unit 210 of the electronic equipment 200 may calculate the first error and the second error according to the angle of transmission of the uplink signal, the angle of transmission of the downlink signal, the angle of arrival of the uplink signal, and the angle of arrival of the downlink signal, so as to calculate the complex channel parameter of the direct path. Then, the positioning unit 210 determines the distance between the network side equipment and the user equipment according to the complex channel parameter. A sequential order of the first positioning duration and the second positioning duration is not specified herein. That is, the network side equipment may transmit the downlink signal first, or the user equipment may transmit the uplink signal first. Each time after one first positioning duration and one second positioning duration, one complex channel parameter is acquired.

According to an embodiment of the present disclosure, multiple first positioning duration and multiple second positioning duration may be set, so that the positioning unit 210 may calculate the distance between the network side equipment and the user equipment according to a phase difference between multiple complex channel parameters calculated by transmitting the uplink signal and the downlink signal multiple times. Preferably, the multiple times may be two times.

According to an embodiment of the present disclosure, in the second positioning duration, the network side equipment may use different carriers to transmit the downlink signal, such as a PRS (Positioning Reference Signal). That is, a wavelength of the carrier for transmitting the downlink signal varies with different frequencies of the carrier, so that different complex channel parameters can be acquired.

Figure 6:
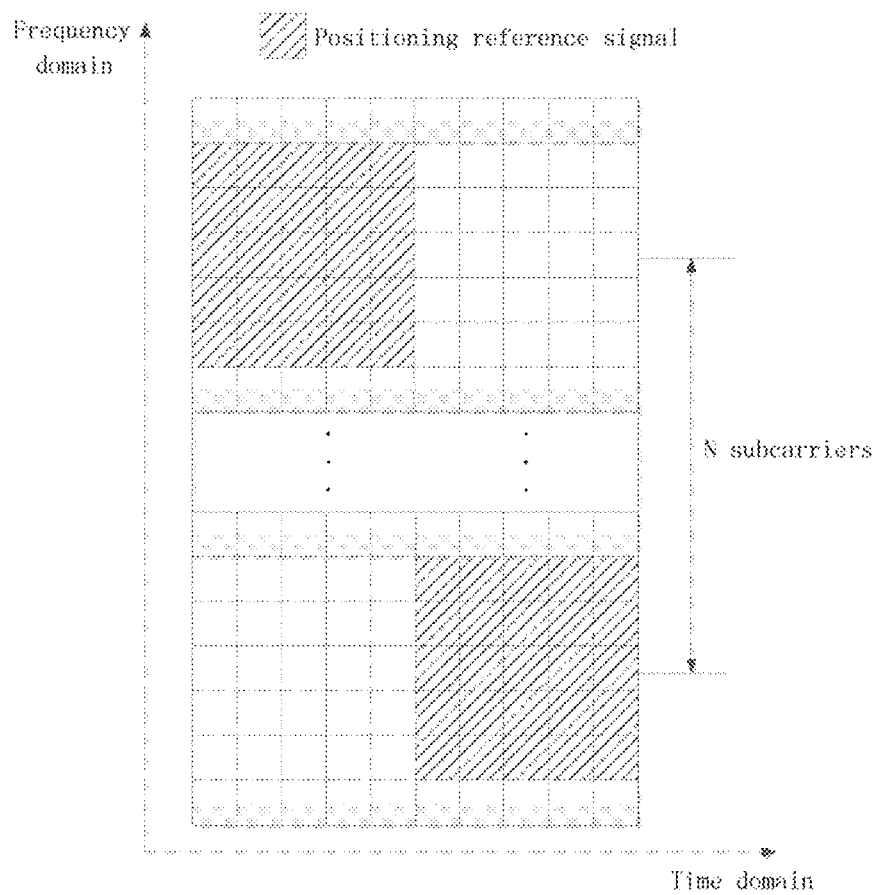
FIG. 6 is a schematic diagram showing a time-frequency position of a positioning reference signal according to an embodiment of the present disclosure.

FIG. 6 is a schematic diagram showing a time-frequency position of a positioning reference signal according to an embodiment of the present disclosure. As shown in FIG. 6, an upper slanted portion represents a time-frequency position of a PRS transmitted for the first time, and a lower slanted portion represents a time-frequency position of the PRS transmitted for the second time. The PRS transmitted for the first time and the PRS transmitted for the second time are separated by N subcarriers. Here, it is assumed that a center frequency of the PRS transmitted for the first time is $f_1$ and a center frequency of the PRS transmitted for the second time is $f_2$, there are the following formulas:

$$\varphi_1 = 2n_1\pi + \psi_1 = \frac{2\pi f_1}{c} R \tag{29}$$

$$\varphi_2 = 2n_2\pi + \psi_2 = \frac{2\pi f_2}{c} R \tag{30}$$

Here, $\varphi_1$ represents a phase angle of a complex channel parameter calculated according to the PRS transmitted for the first time, $\varphi_2$ represents a phase angle of the complex channel parameter calculated according to the PRS transmitted for the second time, $n_1$ and $n_2$ are both natural numbers, $\psi_1 < 2\pi$ and $\psi_2 < 2\pi$. c represents a speed of light, and R represents a distance between the network side equipment and the user equipment.

Formula (30) is subtracted from formula (29) to acquire the following formula:

$$\varphi_1 - \varphi_2 == \frac{2\pi(f_1 - f_2)}{c} R \quad (31)$$

Therefore, the distance R between the network side equipment and the user equipment may be obtained as follows:

$$R = \frac{c(\varphi_1 - \varphi_2)}{2\pi(f_1 - f_2)} \quad (32)$$

As described above, the positioning unit 210 may calculate the distance between the network side equipment and the user equipment according to the difference between the two phase angles. Further, the positioning unit 210 may calculate the distance according to the difference between the two phase angles and a difference between center frequencies of the downlink signals transmitted for the first time and for the second time (for example, from formula (32)).

As described above, after calculating the distance between the network side equipment and the user equipment, the positioning unit 210 may determine the position of the user equipment according to the distance between the network side equipment and the user equipment, the angle of arrival of the uplink signal, and the position of the network side equipment.

Figure 7:
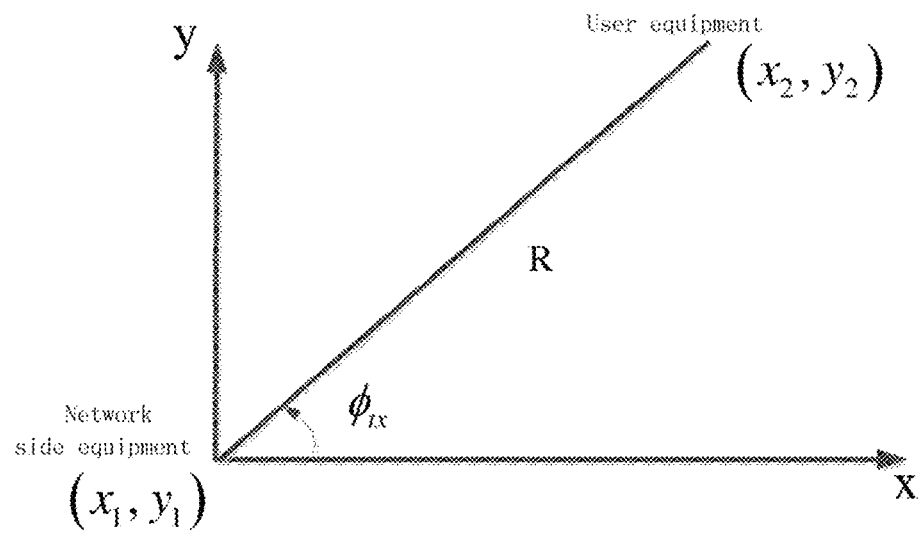
FIG. 7 is a schematic diagram showing a calculation model for positioning a user equipment in the presence of a direct path according to an embodiment of the present disclosure.

FIG. 7 is a schematic diagram showing a calculation model for positioning a user equipment in the presence of a direct path according to an embodiment of the present disclosure. As shown in FIG. 7, it is assumed that coordinates of the network side equipment are $(x_1, y_1)$, the angle of arrival of the uplink signal measured by the network side equipment is $\theta_{rx}$, and the distance between the network side equipment and the user equipment calculated above is R. Coordinates $(x_2, y_2)$ of the user equipment may be determined from the following formulas:

$$x_2 = x_1 + R \cdot \cos(\theta_{rx}) \quad (33)$$

$$y_2 = y_1 + R \cdot \sin(\theta_{rx}) \quad (34)$$

A process of positioning the user equipment by the electronic equipment 200 is described in detail above. In the embodiments described above, there is a direct path between the network side equipment and the user equipment. That is, there is a pair of beams with a channel quality greater than the channel quality threshold among the multiple pairs of beams. That is, the pair of beams closest to the direct path can be selected. That is, in a case that the network side equipment is implemented by the TRP, a TRP with a direct path to the user equipment may be selected to position the user equipment. For example, in the first positioning duration, the TRP receives the uplink signal transmitted by using the uplink transmission beam from the user equipment, and measures the angle of arrival of the uplink signal. In the second positioning duration, the TRP transmits a downlink signal by using a downlink transmission beam to the user equipment, for the user equipment to measure the angle of arrival of the downlink signal. Further, the TRP may calculate a distance between the TRP and the user equipment so as to position the user equipment. Alternatively, the TRP may transmit related parameters to a base station equipment.

The base station equipment calculates the distance between the TRP and the user equipment, so as to position the user equipment.

That is, according to the embodiments of the present disclosure, the user equipment may perform beam sweeping with multiple TRPs around the user equipment, so that the user equipment may transmit pairs of beams and channel quality information for each TRP to the base station equipment. The base station equipment selects the TRP with a direct path to the user equipment. Alternatively, the user equipment may transmit pairs of beams and channel quality information for each TRP to the TRP, so that these TRPs determine whether there is a direct path.

A case that none of all TRPs has a direct path to the user equipment is described below. According to an embodiment of the present disclosure, in the case that none of all TRPs has a direct path to the user equipment, that is, in a case that a channel quality of a pair of beams between each of all TRPs and the user equipment is not greater than the channel quality threshold, the base station equipment may select multiple TRPs to position the user equipment. Preferably, the multiple TRPs may be three TRPs. Each TRP may calculate the distance between the TRP and the user equipment in the same manner as described in the embodiment in the presence of a direct path. However, the distance calculated here is a distance reflected by a reflector.

Figure 8:
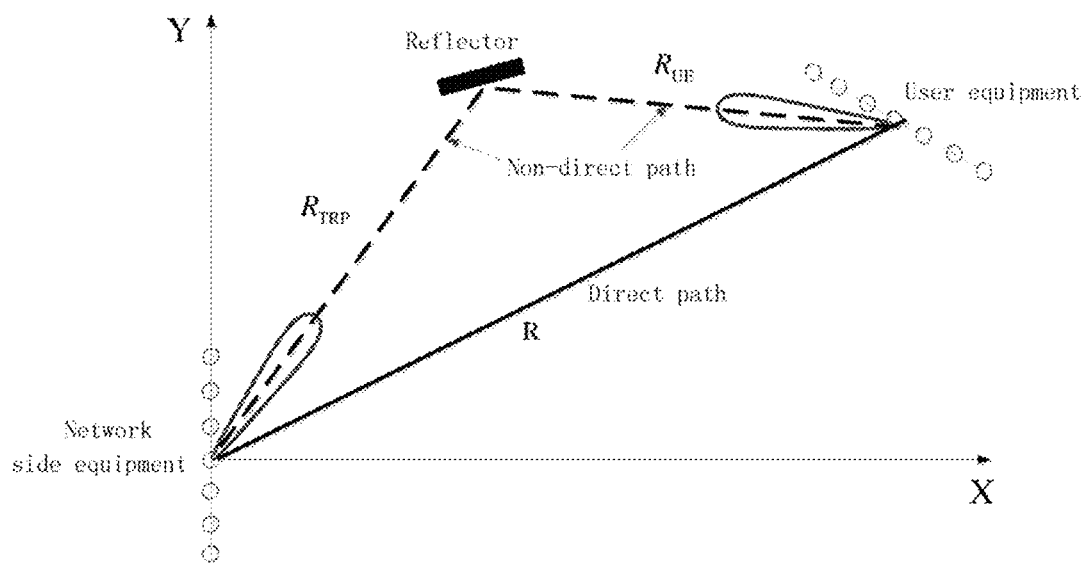
FIG. 8 is a schematic diagram showing a calculation model for positioning a user equipment in the absence of a direct path according to an embodiment of the present disclosure.

FIG. 8 is a schematic diagram showing a calculation model for positioning a user equipment in the absence of a direct path according to an embodiment of the present disclosure. As shown in FIG. 8, there is a reflector between the network side equipment and the user equipment. Therefore, the signal from the transmission end is reflected one time by the reflector, and then is received by the reception end. For example, the distance calculated from formula (32) is actually a curve distance between the network side equipment and the user equipment with the reflector. Therefore, there is the following formula:

$$R_{TRP} + R_{UE} = \frac{c(\varphi_1 - \varphi_2)}{2\pi(f_1 - f_2)} \quad (35)$$

Here, $R_{TRP}$ represents a distance between the TRP and the reflector, $R_{UE}$ represents a distance between the user equipment and the reflector, $f_1$ represents a center frequency of the PRS transmitted for the first time, $f_2$ represents a center frequency of the PRS transmitted for the second time, $\varphi_1$ represents a phase angle of a complex channel parameter calculated according to the PRS transmitted for the first time, and $\varphi_2$ represents a phase angle of a complex channel parameter calculated according to the PRS transmitted for the second time. Here, since a position of the reflector is unknown, the distance acquired from formula (35) may be multiplied by an empirical value to estimate a straight-line distance R between the TRP and the user equipment. The empirical value may be, for example, 0.8. That is, there is the following formula:

$$R = 0.8 \times (R_{TRP} + R_{UE}) \quad (36)$$

As described above, each of the multiple TRPs around the user equipment estimates a straight-line distance between the TRP and the user equipment, so that the electronic equipment 200 (for example, a base station equipment) may estimate the position of the user equipment according to the multiple straight-line distances. For example, in a case that each of the three TRPs estimates a straight-line distance between the TRP and the user equipment, three circles may be made with the three TRPs as centers and the estimated distances as the radius, respectively. An approximate intersection of the three circles may be determined as a final position of the user equipment.

As described above, regardless of whether there is a direct path between the user equipment and the TRP, the distance between the user equipment and the TRP can be calculated according to solutions of the present disclosure, thereby positioning the user equipment.

Further, according to an embodiment of the present disclosure, in a case that it is determined that there is a direct path between the user equipment and the TRP, that is, in a case that the pair of beams closest to the direct path is selected, it may be verified whether there is a direct path between the user equipment and the TRP according to the distance between the TRP and the user equipment after the distance is calculated.

According to an embodiment of the present disclosure, the electronic equipment 200 may: calculate a square of the modulus of the complex channel parameter of the direct path between the user equipment and the network side equipment according to the calculated distance between the user equipment and the network side equipment; determine that there is a direct path between the user equipment and the network side equipment in a case that a difference between the calculated square of the modulus of the complex channel parameter and the channel quality of the selected pair of beams closest to the direct path is less than or equal to a difference threshold; and determine that there is no direct path between the user equipment and the network side equipment in a case that the difference between the calculated square of the modulus of the complex channel parameter and the channel quality of the selected pair of beams closest to the direct path is greater than the difference threshold.

For example, after calculating the distance R between the user equipment and the network side equipment, the electronic equipment 200 may calculate a squared p of the modulus of the complex channel parameter from the following formula:

$$\rho = G_t G_r \left(\frac{\lambda}{4\pi \hat{R}}\right)^2 \quad (37)$$

Here, $G_t$ and $G_r$ respectively represent antenna gains of the network side equipment and the user equipment, $\lambda$ represents a wavelength of a carrier, and $\hat{R}$ represents a distance between the network side equipment and the user equipment calculated according to the embodiment of the present disclosure.

Further, the electronic equipment 200 may calculate the difference between the squared ρ and the channel quality of the selected pair of beams closest to the direct path. Here, it is assumed that the channel quality is represented by an RSRP of the channel and the difference threshold is represented by Λ, it may be considered that there is a direct path between the user equipment and the network side equipment if the following formula is satisfied. Then, the calculated $\hat{R}$ may be considered as accurate, so as to position the user equipment based on the distance $\hat{R}$.

$$|\rho - RSRP| \leq \Lambda \quad (38)$$

Further, according to an embodiment of the present disclosure, it may be considered that there is no direct path between the user equipment and the network side equipment if the following formula is satisfied.

$$|\rho - RSRP| > \Lambda \quad (39)$$

Here, RSRP represents RSRP of the pair of beams closest to the direct path, and p represents the square of the modulus of the complex channel parameter acquired from formula (37).

According to the embodiments of the present disclosure, in a case of no direct path between the user equipment and the network side equipment, if there is other pair of beams with a channel quality greater than the channel quality threshold between the user equipment and the network side equipment, the user equipment is positioned according to the pair of beams. If there is no pair of beams with a channel quality greater than the channel quality threshold between the user equipment and the network side equipment, a network side equipment having a pair of beams with a channel quality greater than the channel quality threshold between the user equipment is selected. If there is none of all network side equipments having a pair of beams with a channel quality greater than the channel quality threshold between the user equipment, multiple network side equipments may be selected to position the user equipment as described above.

Figure 9:
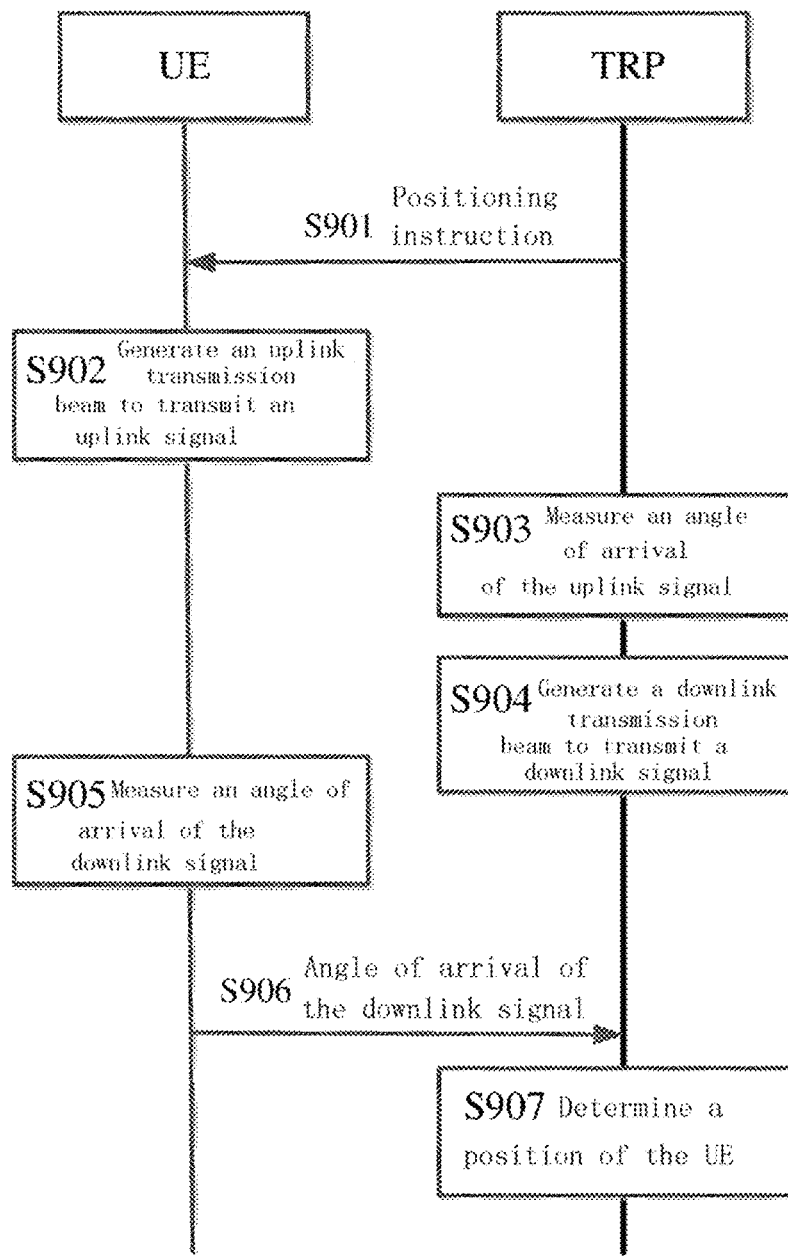
FIG. 9 is a flowchart showing signaling for a TRP to determine a position of a user equipment according to an embodiment of the present disclosure.

FIG. 9 is a flowchart showing signaling for a TRP to determine a position of a user equipment according to an embodiment of the present disclosure. Here, the TRP may represent a network side equipment and an electronic equipment 200. In addition, it is assumed that there is a direct path between the TRP and the UE. As shown in FIG. 9, in step S901, the TRP transmits a positioning instruction message to the UE. The positioning instruction message may include at least one of the following information: a positioning start time, positioning duration, an uplink transmission beam for the user equipment, and a downlink transmission beam for the network side equipment. The information may be acquired from a base station equipment and then transmitted to the UE, or may be determined and transmitted to the UE by the TRP. Next, in step S902, in first positioning duration included in the positioning instruction message, the UE generates an uplink transmission beam and transmits an uplink signal. Next, in step S903, the TRP does not generate a reception beam, so as to measure the angle of arrival of the uplink signal. Next, in step S904, in second positioning duration included in the positioning instruction message, the TRP generates a downlink transmission beam and transmits a downlink signal. Next, in step S905, the UE does not generate a reception beam, so as to measure the angle of arrival of the downlink signal. Next, in step S906, the UE transmits the measured angle of arrival of the downlink signal to the TRP. Next, in step S907, the TRP calculates the distance between the TRP and the UE according to the angle of arrival of the uplink signal and the angle of arrival of the downlink signal, so as to determine the position of the UE.

Figure 10:
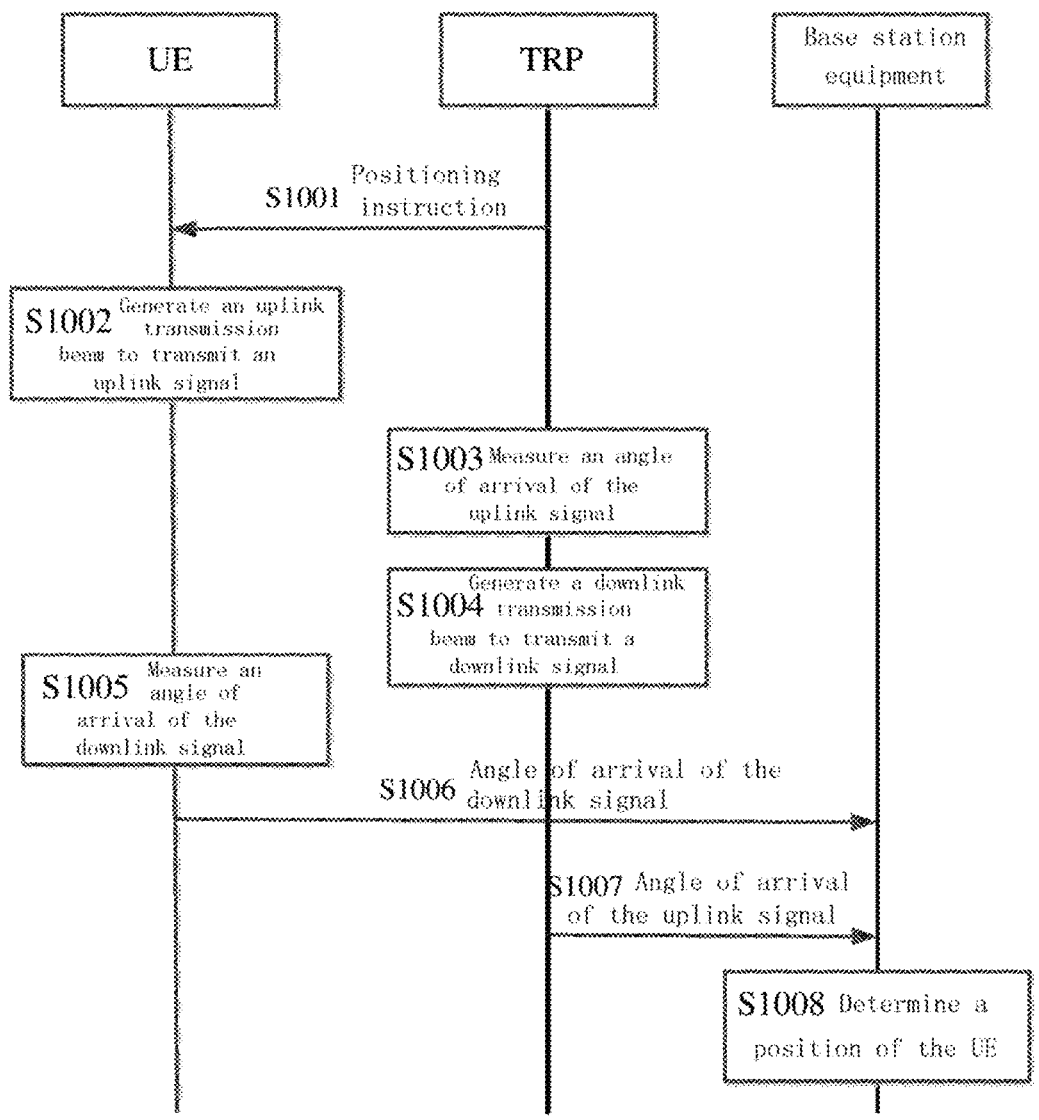
FIG. 10 is a flowchart showing signaling for a base station equipment to determine a position of a user equipment according to an embodiment of the present disclosure.

FIG. 10 is a flowchart showing signaling for a base station equipment to determine a position of a user equipment according to an embodiment of the present disclosure. Here, TRP may represent a network side equipment, and the base station equipment may represent the electronic equipment 200. Further, it is assumed that there is a direct path between the TRP and the UE. As shown in FIG. 10, in step S1001, the TRP transmits a positioning instruction message to the UE. The positioning instruction message may include at least one of the following information: a positioning start time, positioning duration, an uplink transmission beam for the user equipment, and a downlink transmission beam for the network side equipment. The information may be acquired from a base station equipment and then transmitted to the UE, or may be determined and transmitted to the UE by the TRP. Next, in step S1002, in first positioning duration included in the positioning instruction message, the UE generates an uplink transmission beam and transmits an uplink signal. Next, in step S1003, the TRP does not generate a reception beam, so as to measure the angle of arrival of the uplink signal. Next, in step S1004, in second positioning duration included in the positioning instruction message, the TRP generates a downlink transmission beam and transmits a downlink signal. Next, in step S1005, the UE does not generate a reception beam, so as to measure the angle of arrival of the downlink signal. Next, in step S1006, the UE transmits the measured angle of arrival of the downlink signal to the base station equipment. Next, in step S1007, the TRP transmits the measured angle of arrival of the uplink signal to the base station equipment. Next, in step S1008, the base station equipment calculates the distance between the TRP and the UE according to the angle of arrival of the uplink signal and the angle of arrival of the downlink signal, so as to determine the position of the UE.

It can be seen that, according to the embodiments of the present disclosure, the distance between the network side equipment and the user equipment may be estimated according to the angle of arrival of the downlink signal and the angle of arrival of the uplink signal, so as to position the user equipment. In this way, the distance is determined based on the two angles of arrival, so that the determined distance is accurate. Further, the user equipment may be positioned according to the determined distance and a true angle of arrival of the uplink signal, so that the user equipment can be positioned accurately. In addition, according to the embodiments of the present disclosure, in the case of no direct path between the network side equipment and the user equipment, a final position of the user equipment can be estimated based on a distance between each of the multiple network side equipments and the user equipment measured by the network side equipment. Further, according to the embodiment of the present disclosure, it may also be verified whether there is a direct path between the network side equipment and the user equipment according to the estimated distance between the network side equipment and the user equipment, such that the determined position of the user equipment is more accurate.

3. Configuration Example for a User Equipment

Figure 11:
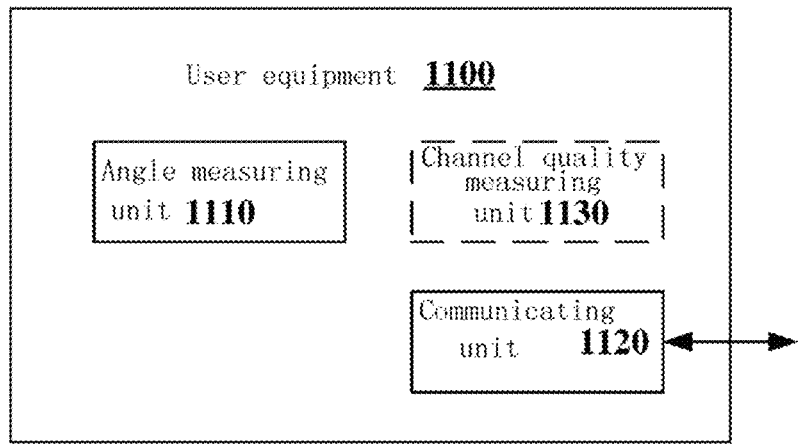
FIG. 11 is a block diagram showing an example of configuration of a user equipment according to an embodiment of the present disclosure.

FIG. 11 is a block diagram showing a structure of a user equipment 1100 in a wireless communication system according to an embodiment of the present disclosure. Here, the user equipment 1100 may be arranged in, for example, a wireless communication system including a single base station equipment.

As shown in FIG. 11, the user equipment 1100 may include an angle measuring unit 1110 and a communicating unit 1120.

Here, each unit of the user equipment 1100 may be included in processing circuitry. It should be noted that the user equipment 1100 may include one processing circuitry or multiple processing circuitry. Further, the processing circuitry may include various discrete functional units to perform various functions and/or operations. It should be noted that these functional units may be physical entities or logical entities, and units with different names may be implemented by one physical entity.

According to an embodiment of the present disclosure, the angle measuring unit 1110 may measure an angle of arrival of a downlink signal.

According to an embodiment of the present disclosure, the communicating unit 1120 may transmit the angle of arrival of the downlink signal, for a network side equipment or a base station equipment serving a network side equipment to calculate a distance between the network side equipment and the user equipment according to the angle of arrival of the downlink signal and an angle of arrival of a uplink signal measured by the network side equipment, and determine a position of the user equipment according to the distance between the network side equipment and the user equipment and the angle of arrival of the uplink signal.

Here, the network side equipment may be, for example, a TRP. In a case that the TRP determines the position of the user equipment, the communicating unit 1120 may transmit the angle of arrival of the downlink signal measured by the user equipment to the TRP, for the TRP to determine the position of the user equipment. In a case that the base station equipment determines the position of the user equipment, the communicating unit 1120 may transmit the angle of arrival of the downlink signal measured by the user equipment to the base station equipment, for the base station equipment to determine the position of the user equipment.

As described above, according to the embodiment of the present disclosure, the user equipment may measure the angle of arrival of the downlink signal, so that the network side equipment or the base station equipment may estimate the distance between the network side equipment and the user equipment according to the angle of arrival of the downlink signal and the angle of arrival of the uplink signal, so as to position the user equipment. In this way, the distance is determined based on the two angles of arrival, so that the determined distance is accurate. Further, the user equipment may be positioned according to the determined distance and a true angle of arrival of the uplink signal, so that the user equipment can be positioned accurately.

According to an embodiment of the present disclosure, the communicating unit 1120 may receive a positioning instruction message. The positioning instruction message may include at least one of the following information: a positioning start time, positioning duration, an uplink transmission beam for the user equipment, and a downlink transmission beam for the network side equipment. For example, the positioning duration may include first positioning duration and second positioning duration, which is described in detail in the foregoing, and is not repeated here.

According to an embodiment of the present disclosure, the communicating unit 1120 may further transmit an uplink signal to the network side equipment by using the uplink transmission beam, for the network side equipment to measure the angle of arrival of the uplink signal. For example, in the first positioning duration, the communicating unit 1120 transmits the uplink signal to the network side equipment by using the uplink transmission beam. The network side equipment does not generate a reception beam, so as to measure the angle of arrival of the uplink signal.

According to an embodiment of the present disclosure, the communicating unit 1120 may further receive a downlink signal transmitted by using a downlink transmission beam from the network side equipment, so as to measure the angle of arrival of the downlink signal. Further, when the communicating unit 1120 receives the downlink signal from the network side equipment, a reception beam is not generated, and the angle of arrival of the downlink signal may be measured according to downlink signals received by different antennas of the user equipment.

According to an embodiment of the present disclosure, as shown in FIG. 11, the user equipment 1100 may further include a channel quality measuring unit 1130, which is configured to measure a channel quality of each pair of beams between the user equipment 1100 and the network side equipment. Further, the user equipment 1100 may measure the channel quality of each pair of beams during beam sweeping. In addition, the user equipment 1100 may further report multiple pairs of beams and a channel quality of each of the multiple pairs of beams to the network side equipment via the communicating unit 1120, for the network side equipment to select a pair of beams closest to the direct path. Alternatively, the user equipment 1100 may report the multiple pairs of beams and the channel quality of each of the multiple pairs of beams to the base station equipment, for the base station equipment to select the pair of beams closest to the direct path between the network side equipment and the user equipment.

The electronic equipment 200 according to the embodiment of the present disclosure may serve as a TRP or a base station equipment that serves the user equipment 1100. Therefore, all embodiments described above regarding the electronic equipment 200 are applicable to this example.

4. Embodiment of a Method

Next, a wireless communication method performed by the electronic equipment 200 serving as a network side equipment in the wireless communication system is described in detail according to an embodiment of the present disclosure.

Figure 12:
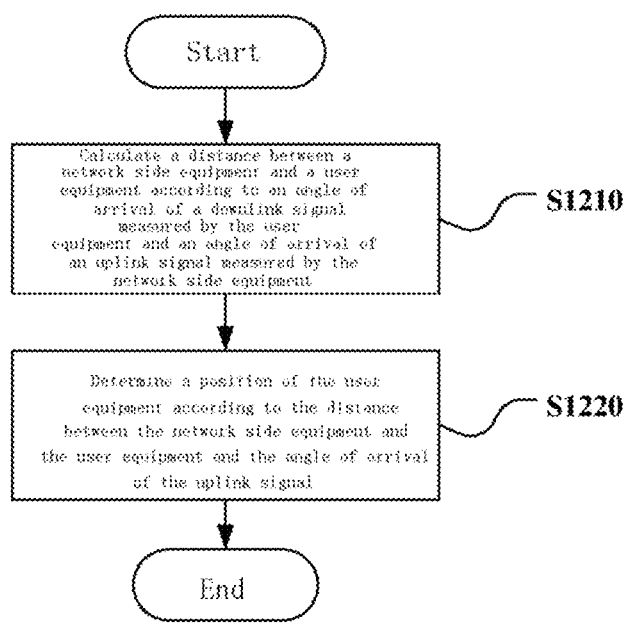
FIG. 12 is a flowchart showing a wireless communication method performed by an electronic equipment according to an embodiment of the present disclosure.

FIG. 12 is a flowchart showing a wireless communication method performed by an electronic equipment 200 serving as a network side equipment in a wireless communication system according to an embodiment of the present disclosure.

As shown in FIG. 12, in step S1210, a distance between the network side equipment and a user equipment is calculated according to an angle of arrival of a downlink signal measured by the user equipment and an angle of arrival of an uplink signal measured by the network side equipment.

Next, in step S1220, a position of the user equipment is determined according to the distance between the network side equipment and the user equipment and the angle of arrival of the uplink signal.

Preferably, the calculating the distance between the network side equipment and the user equipment includes: calculating the distance between the network side equipment and the user equipment according to an angle of transmission of the uplink signal, an angle of transmission of the downlink signal, the angle of arrival of the downlink signal and the angle of arrival of the uplink signal.

Preferably, the calculating the distance between the network side equipment and the user equipment further includes: calculating a first error between a direction of an uplink transmission beam and a direction of a direct path between the user equipment and the network side equipment according to the angle of transmission of the uplink signal and the angle of arrival of the downlink signal; calculating a second error between a direction of a downlink transmission beam and the direction of the direct path according to the angle of transmission of the downlink signal and the angle of arrival of the uplink signal; and calculating the distance between the network side equipment and the user equipment according to the first error and the second error.

Preferably, the calculating the first error includes: calculating a downlink reception beamforming vector according to the angle of transmission of the uplink signal, calculating a response vector of a downlink channel matrix of the direct path according to the angle of arrival of the downlink signal, and calculating the first error according to the downlink reception beamforming vector and the response vector. The response vector represents a portion in the downlink channel matrix which is associated with the angle of arrival of the downlink signal. The calculating the second error includes: calculating a downlink transmission beamforming vector according to the angle of transmission of the downlink signal, calculating a steering vector of the downlink channel matrix of the direct path according to the angle of arrival of the uplink signal, and calculating the second error according to the downlink transmission beamforming vector and the steering vector. The steering vector represents a portion in the downlink channel matrix which is associated with the angle of arrival of the uplink signal.

Preferably, the calculating the distance between the network side equipment and the user equipment further includes: acquiring a complex channel parameter of the direct path according to the first error and the second error; and calculating the distance between the network side equipment and the user equipment according to the complex channel parameter of the direct path.

Preferably, the calculating the distance between the network side equipment and the user equipment further includes: calculating the distance between the network side equipment and the user equipment according to a phase difference between multiple complex channel parameters calculated by transmitting an uplink signal and a downlink signal multiple times.

Preferably, the angle of arrival of the downlink signal and the angle of arrival of the uplink signal are associated with the direct path between the user equipment and the network side equipment.

Preferably, the angle of transmission of the uplink signal is associated with a direction of an uplink transmission beam of the user equipment, and the angle of transmission of the downlink signal is associated with a direction of a downlink transmission beam of the network side equipment.

Preferably, the wireless communication method further includes: selecting a pair of beams closest to the direct path, from multiple pairs of beams between the user equipment and the network side equipment, as the uplink transmission beam and the downlink transmission beam.

Preferably, the selecting the pair of beams closest to the direct path includes: selecting the pair of beams closest to the direct path according to a channel quality of each of multiple pairs of beams.

Preferably, the selecting the pair of beams closest to the direct path includes:

selecting, from the multiple pairs of beams, a pair of beams with a channel quality greater than a channel quality threshold and being a best channel quality as the pair of beams closest to the direct path.

Preferably, the wireless communication method further includes: determining the channel quality threshold according to coverage of the network side equipment.

Preferably, the determining the position of the user equipment includes: determining the position of the user equipment according to the distance between the network side equipment and the user equipment, the angle of arrival of the uplink signal, and a position of the network side equipment.

Preferably, the wireless communication method further includes: transmitting a positioning instruction message to the user equipment. The positioning instruction message includes at least one of the following: a positioning start time, positioning duration, an uplink transmission beam for the user equipment, and a downlink transmission beam for the network side equipment.

Preferably, the electronic equipment serves as the network side equipment, and the wireless communication method further includes: transmitting the downlink signal to the user equipment by using a downlink transmission beam, and receiving the angle of arrival of the downlink signal measured by the user equipment; and receiving the uplink signal from the user equipment transmitted by using an uplink transmission beam, and measuring the angle of arrival of the uplink signal.

Preferably, the wireless communication method further includes: measuring the angle of arrival of the uplink signal according to uplink signals received by different antennas of the network side equipment without generating a reception beam, when receiving the uplink signal from the user equipment.

Preferably, the electronic equipment serves as a base station equipment, and the wireless communication method further includes: receiving the angle of arrival of the downlink signal from the user equipment; and receiving the angle of arrival of the uplink signal from the network side equipment.

According to an embodiment of the present disclosure, the above method may be performed by the electronic equipment 200 according to the embodiment of the present disclosure. Therefore, all embodiments regarding the electronic equipment 200 in the foregoing are applicable to this method.

Next, a wireless communication method performed by the user equipment 1100 in the wireless communication system is described in detail according to an embodiment of the present disclosure.

Figure 13:
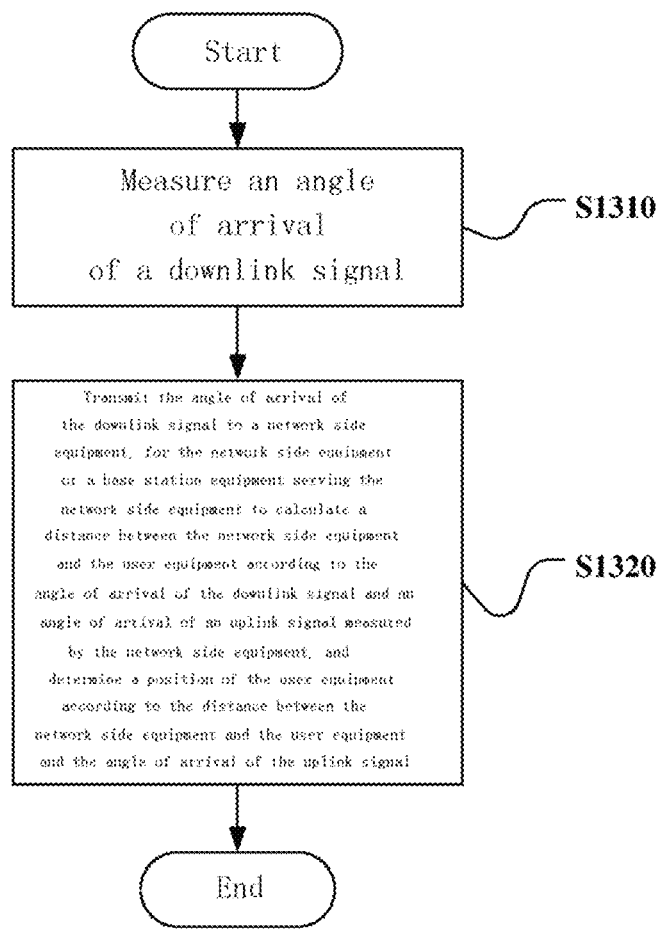
FIG. 13 is a flowchart showing a wireless communication method performed by a user equipment according to an embodiment of the present disclosure.

FIG. 13 is a flowchart showing a wireless communication method performed by the user equipment 1100 in the wireless communication system according to an embodiment of the present disclosure.

As shown in FIG. 13, in step S1310, an angle of arrival of a downlink signal is measured.

Next, in step S1320, the angle of arrival of the downlink signal is transmitted, for a network side equipment or a base station equipment serving the network side equipment to calculate a distance between the network side equipment and the user equipment according to the angle of arrival of the downlink signal and an angle of arrival of an uplink signal measured by the network side equipment and determine a position of the user equipment according to the distance between the network side equipment and the user equipment and the angle of arrival of the uplink signal.

Preferably, the wireless communication method further includes: transmitting the uplink signal to the network side equipment by using an uplink transmission beam, for the network side equipment to measure the angle of arrival of the uplink signal; and receiving the downlink signal transmitted by using a downlink transmission beam from the network side equipment, and measuring the angle of arrival of the downlink signal.

Preferably, the wireless communication method further includes: measuring the angle of arrival of the downlink signal according to downlink signals received by different antennas of the user equipment without generating a reception beam, when receiving the downlink signal from the network side equipment.

Preferably, the wireless communication method further includes: receiving a positioning instruction message. The positioning instruction message includes at least one of the following: a positioning start time, positioning duration, an uplink transmission beam for the user equipment, and a downlink transmission beam for the network side equipment.

Preferably, the wireless communication method further includes: during beam sweeping, measuring a channel quality of each of multiple pairs of beams between the user equipment and the network side equipment; and reporting the multiple pairs of beams and the channel quality of each of the multiple pairs of beams to the network side equipment.

According to an embodiment of the present disclosure, the above method may be performed by the user equipment 1100 according to the embodiment of the present disclosure. Therefore, all embodiments regarding the user equipment 1100 in the foregoing are applicable to this method.

5. Application Example

The technology according to the present disclosure is applicable to various products.

The network side equipment may be implemented as any type of TRP. The TRP may be capable of transmitting and receiving. For example, the TRP may receive information from a user equipment and a base station equipment, and may also transmit information to the user equipment and the base station equipment. In a typical example, the TRP may serve the user equipment and is controlled by the base station equipment. Further, the TRP may have a structure similar to the base station equipment described below, or may only have a structure related to transmission and reception of information in the base station equipment.

The network side equipment may be implemented as any type of base station equipment, such as a macro eNB and a small eNB, and may also be implemented as any type of gNB (that is, a base station in a 5G system). The small eNB may be an eNB covering a cell smaller than a macro cell, such as a pico eNB, a micro eNB, and a home (femto) eNB. Alternatively, the base station may be implemented as any other type of base station, such as a NodeB and a base transceiver station (BTS). The base station may include: a main body (also referred to as a base station equipment) configured to control wireless communication; and one or more remote wireless head ends (RRHs) provided at different positions from the main body.

The user equipment may be implemented as a mobile terminal (such as a smart phone, a tablet personal computer (PC), a notebook PC, a portable game terminal, a portable/dongle-type mobile router, and a digital camera) or an vehicle terminal (such as an vehicle navigation equipment). The user equipment may also be implemented as a terminal that performs machine-to-machine (M2M) communication (also referred to as a machine type communication (MTC) terminal). In addition, the user equipment may be a wireless communication module (such as an integrated circuitry module including a single wafer) mounted on each of the user equipments described above.

Application Example for a Base Station

First Application Example

Figure 14:
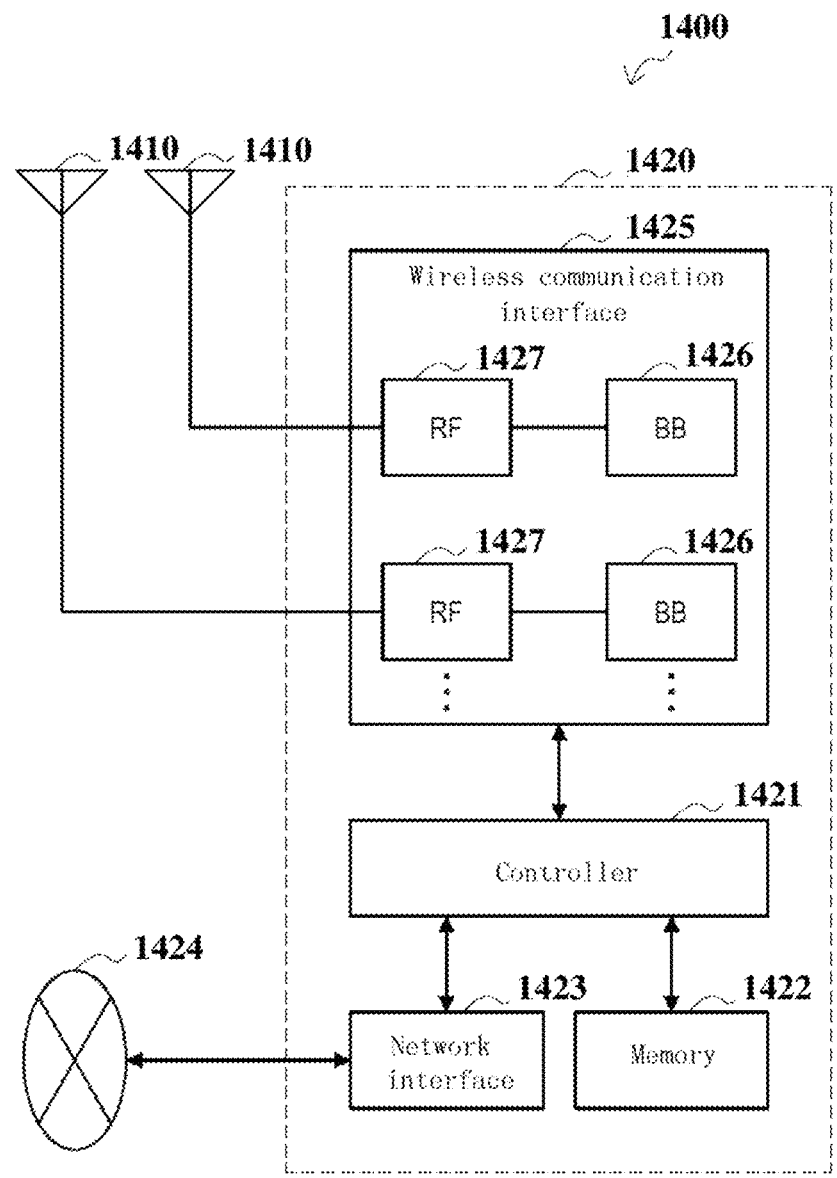
FIG. 14 is a block diagram showing a first example of schematic configuration of an eNB (Evolved NodeB)

FIG. 14 is a block diagram showing a first example of a schematic configuration of an eNB to which the technology according to the present disclosure may be applied. An eNB 1400 includes one or more antennas 1410 and a base station equipment 1420. Each antenna 1410 may be connected to the base station equipment 1420 via an RF cable.

Each of the antennas 1410 includes a single antenna element or multiple antenna elements (such as multiple antenna elements included in a multiple input multiple output (MIMO) antenna), and is used for the base station equipment 1420 to transmit and receive a wireless signal. As shown in FIG. 14, the eNB 1400 may include multiple antennas 1410. For example, the multiple antennas 1410 may be compatible with multiple frequency bands used by the eNB 1400. Although FIG. 14 shows an example in which the eNB 1400 includes multiple antennas 1410, the eNB 1400 may include a single antenna 1410.

The base station equipment 1420 includes a controller 1421, a memory 1422, a network interface 1423, and a wireless communication interface 1425.

The controller 1421 may be, for example, a CPU or a DSP, and operates various functions of a higher layer of the base station equipment 1420. For example, the controller 1421 generates a data packet based on data in a signal processed by the wireless communication interface 1425, and transfers the generated packet via the network interface 1423. The controller 1421 may bundle data from multiple baseband processors to generate a bundle packet, and transfer the generated bundle packet. The controller 1421 may have a logical function of performing control such as radio resource control, radio bearer control, mobility management, admission control, and scheduling. This control may be performed in combination with a nearby eNB or core network node. The memory 1822 includes an RAM and an ROM, and stores a program executed by the controller 1421 and various types of control data (such as a terminal list, transmission power data, and scheduling data).

The network interface 1423 is a communication interface for connecting the base station equipment 1420 to a core network 1424. The controller 1421 may communicate with a core network node or another eNB via the network interface 1423. In this case, the eNB 1400 may be connected to the core network node or another eNB via a logical interface (such as an S1 interface and an X2 interface). The network interface 1423 may also be a wired communication interface or a wireless communication interface for wireless backhaul line. In a case that the network interface 1423 is a wireless communication interface, the network interface 1423 may use a higher frequency band for wireless communication than a frequency band used by the wireless communication interface 1425.

The wireless communication interface 1425 supports any cellular communication scheme (such as Long Term Evolution (LTE) and LTE-Advanced), and provides a wireless connection to a terminal located in a cell of the eNB 1400 via the antenna 1410. The wireless communication interface 1425 may generally include, for example, a baseband (BB) processor 1426 and an RF circuitry 1427. The BB processor 1426 may perform, for example, encoding/decoding, modulating/demodulating, and multiplexing/demultiplexing, and perform various types of signal processing of a layer (such as L1, media access control (MAC), radio link control (RLC), and packet data aggregation protocol (PDCP)). Instead of the controller 1421, the BB processor 1426 may have some or all of the above-mentioned logical functions. The BB processor 1426 may be a memory storing a communication control program, or a module including a processor and a related circuitry configured to execute the program. The function of the BB processor 1426 may be changed by updating the program. The module may be a card or blade inserted into a slot of the base station equipment 1420. Alternatively, the module may be a chip mounted on the card or blade. Further, the RF circuitry 1427 may include, for example, a mixer, a filter, and an amplifier, and transmits and receives wireless signals via the antenna 1410.

As shown in FIG. 14, the wireless communication interface 1425 may include multiple BB processors 1426. For example, the multiple BB processors 1426 may be compatible with multiple frequency bands used by the eNB 1400. As shown in FIG. 14, the wireless communication interface 1425 may include multiple RF circuitry 1427. For example, the multiple RF circuitry 1427 may be compatible with multiple antenna elements. Although FIG. 14 shows an example in which the wireless communication interface 1425 includes multiple BB processors 1426 and multiple RF circuitry 1427, the wireless communication interface 1425 may include a single BB processor 1426 or a single RF circuitry 1427.

Second Application Example

Figure 15:
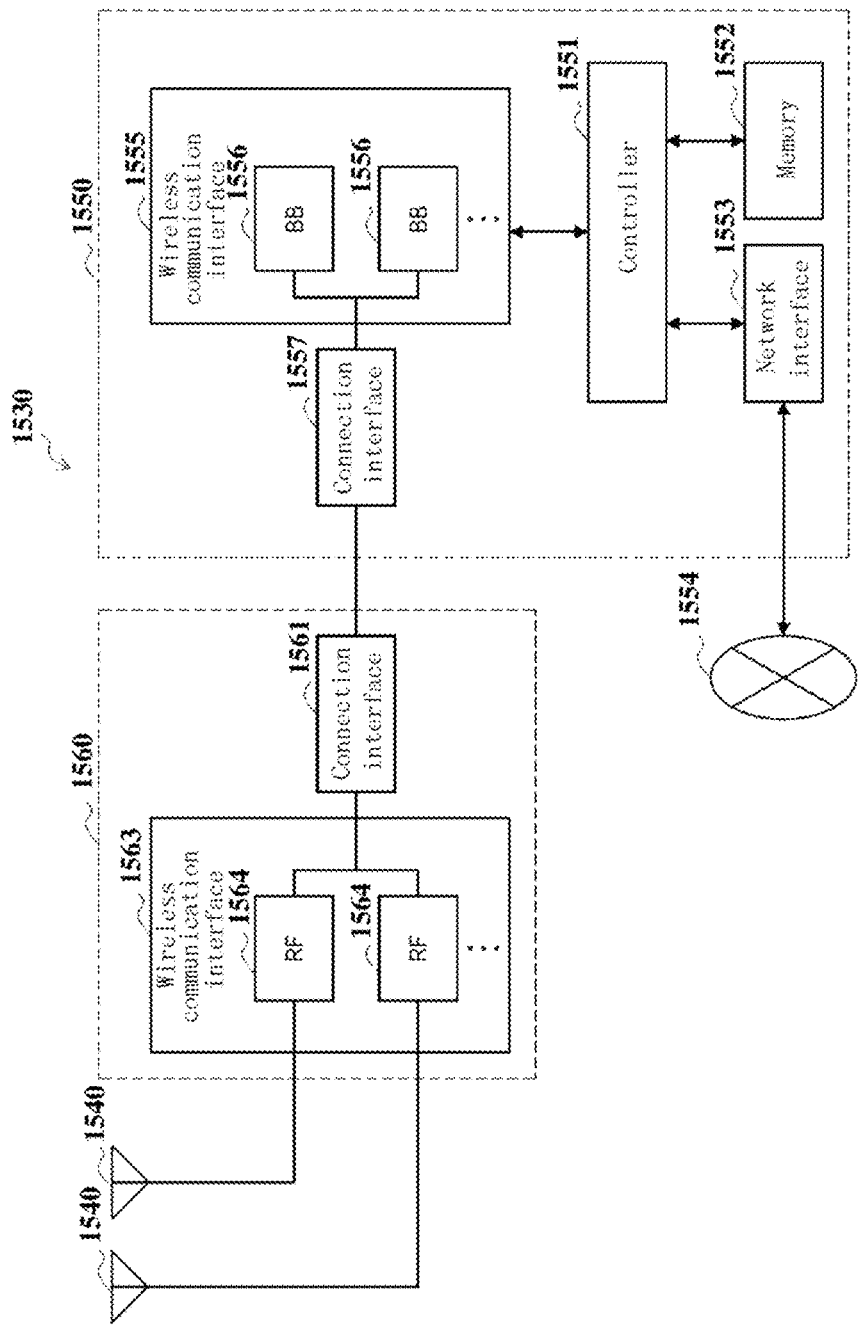
FIG. 15 is a block diagram showing a second example of the schematic configuration of the eNB.

FIG. 15 is a block diagram showing a second example of a schematic configuration of an eNB to which the technology according to the present disclosure may be applied. An eNB 1530 includes one or more antennas 1540, a base station equipment 1550, and an RRH 1560. Each antenna 1540 may be connected to the RRH 1560 and via an RF cable. The base station equipment 1550 may be connected to the RRH 1560 via a high-speed line such as an optical fiber cable.

Each of the antennas 1540 includes a single antenna element or multiple antenna elements (such as multiple antenna elements included in a MIMO antenna) and is used for the RRH 1560 to transmit and receive wireless signals. As shown in FIG. 15, the eNB 1530 may include multiple antennas 1540. For example, the multiple antennas 1540 may be compatible with multiple frequency bands used by the eNB 1530. Although FIG. 15 shows an example in which the eNB 1530 includes multiple antennas 1540, the eNB 1530 may include a single antenna 1540. The base station equipment 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG.

The base station equipment 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 14, respectively.

The wireless communication interface 1555 supports any cellular communication scheme (such as LTE and LTE-advanced), and provides wireless communication to a terminal located in a sector corresponding to the RRH 1560 via the RRH 1560 and the antenna 1540. The wireless communication interface 1555 may generally include, for example, a BB processor 1556. The BB processor 1556 is the same as the BB processor 1426 described with reference to FIG. 15 except that the BB processor 1556 is connected to the RF circuitry 1564 of the RRH 1560 via the connection interface 1557. As shown in FIG. 15, the wireless communication interface 1555 may include multiple BB processors 1556. For example, the multiple BB processors 1556 may be compatible with multiple frequency bands used by the eNB 1530. Although FIG. 15 shows an example in which the wireless communication interface 1555 includes multiple BB processors 1556, the wireless communication interface 1555 may include a single BB processor 1556.

The connection interface 1557 is an interface for connecting the base station equipment 1550 (wireless communication interface 1555) to the RRH 1560. The connection interface 1557 may also be a communication module for communication in the above-described high-speed line via which the base station equipment 1550 (wireless communication interface 1555) is connected to the RRH 1560.

The RRH 1560 includes a connection interface 1561 and a wireless communication interface 1563.

The connection interface 1561 is an interface for connecting the RRH 1560 (wireless communication interface 1563) to the base station equipment 1550. The connection interface 1561 may also be a communication module for communication in the above described high-speed line.

The wireless communication interface 1563 transmits and receives wireless signals via the antenna 1540. The wireless communication interface 1563 may generally include, for example, an RF circuitry 1564. The RF circuitry 1564 may include, for example, a mixer, a filter, and an amplifier, and transmits and receives wireless signals via the antenna 1540. As shown in FIG. 15, the wireless communication interface 1563 may include multiple RF circuitry 1564. For example, the multiple RF circuitry 1564 may support multiple antenna elements. Although FIG. 15 shows an example in which the wireless communication interface 1563 includes multiple RF circuitry 1564, the wireless communication interface 1563 may also include a single RF circuitry 1564.

In the eNB 1400 and the eNB 1530 shown in FIGS. 14 and 15, the positioning unit 210, the selecting unit 230, and the measuring unit 240 described with reference to FIG. 2 may be implemented by the controller 1421 and/or the controller 1551. At least a part of functions may be implemented by the controller 1421 and the controller 1551. For example, the controller 1421 and/or the controller 1551 may position the user equipment, select the pair of beams, and measure the angle of arrival of the uplink channel by executing instructions stored in a corresponding memory.

Application Example for a Terminal Equipment

First Application Example

Figure 16:
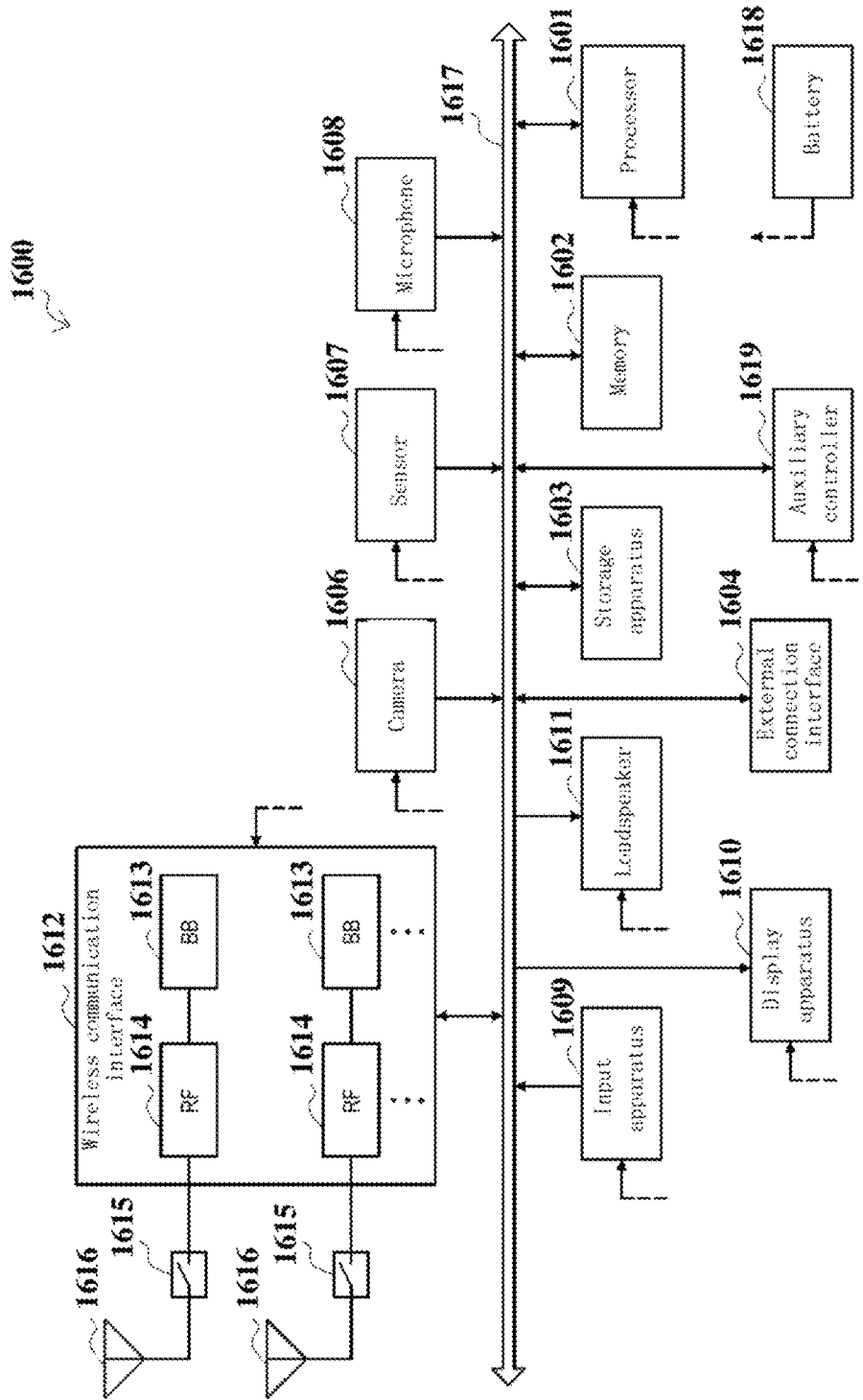
FIG. 16 is a block diagram showing an example of schematic configuration of a smartphone.

FIG. 16 is a block diagram showing an example of a schematic configuration of a smartphone 1600 to which the technology according to the present disclosure may be applied. The smartphone 1600 includes a processor 1601, a memory 1602, a storage apparatus 1603, an external connection interface 1604, a camera 1606, a sensor 1607, a microphone 1608, an input apparatus 1609, a display apparatus 1610, a loudspeaker 1611, a wireless communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The memory 1602 includes an RAM and an ROM, and stores data and a program executed by the processor 1601. The storage apparatus 1603 may include a storage medium such as a semiconductor memory and a hard disk. The external connection interface 1604 is an interface for connecting an external apparatus (such as a memory card and a universal serial bus (USB) apparatus) to the smartphone 1600.

The camera 1606 includes an image sensor (such as a charge coupled device (CCD) and a complementary metal oxide semiconductor (CMOS)), and generates a captured image. The sensor 1607 may include a group of sensors, such as a measurement sensor, a gyro sensor, a geomagnetic sensor, and an acceleration sensor. The microphone 1608 converts a sound inputted to the smartphone 1600 into an audio signal. The input apparatus 1609 includes, for example, a touch sensor configured to detect a touch on a screen of the display apparatus 1610, a keypad, a keyboard, a button, or a switch, and receives operation or information inputted from the user. The display apparatus 1610 includes a screen (such as a liquid crystal display (LCD) and an organic light emitting diode (OLED) display), and displays an output image of the smartphone 1600. The loudspeaker 1611 converts the audio signal outputted from the smartphone 1600 into sound.

The wireless communication interface 1612 supports any cellular communication scheme (such as LTE and LTE-Advanced) and performs wireless communication. The wireless communication interface 1612 may generally include, for example, a BB processor 1613 and an RF circuitry 1614. The BB processor 1613 may perform, for example, encoding/decoding, modulating/demodulating, and multiplexing/demultiplexing, and perform various types of signal processing for wireless communication. Further, the RF circuitry 1614 may include, for example, a mixer, a filter, and an amplifier, and transmits and receives wireless signals via the antenna 1616. The wireless communication interface 1612 may be a chip module on which the BB processor 1613 and the RF circuitry 1614 are integrated. As shown in FIG. 16, the wireless communication interface 1612 may include multiple BB processors 1613 and multiple RF circuitry 1614. Although FI. 16 shows an example in which the wireless communication interface 1612 includes multiple BB processors 1613 and multiple RF circuitry 1614, the wireless communication interface 1612 may also include a single BB processor 1613 or a single RF circuitry 1614.

In addition to the cellular communication scheme, the wireless communication interface 1612 may support other type of wireless communication scheme, such as a short-range wireless communication scheme, a near field communication scheme, and a wireless local area network (LAN) scheme. In this case, the wireless communication interface 1612 may include a BB processor 1613 and an RF circuitry 1614 for each wireless communication scheme.

Each of the antenna switches 1615 switches a connection destination of the antenna 1616 among multiple circuitry (for example, circuitry for different wireless communication schemes) included in the wireless communication interface 1612.

Each of the antennas 1616 includes a single antenna element or multiple antenna elements (for example, multiple antenna elements included in a MIMO antenna), and is used for the wireless communication interface 1612 to transmit and receive wireless signals. As shown in FIG. 16, the smartphone 1600 may include multiple antennas 1616. Although FIG. 16 shows an example in which the smartphone 1600 includes multiple antennas 1616, the smartphone 1600 may also include a single antenna 1616.

In addition, the smartphone 1600 may include an antenna 1616 for each wireless communication scheme. In this case, the antenna switch 1615 may be omitted from the configuration of the smartphone 1600.

The processor 1601, the memory 1602, the storage apparatus 1603, the external connection interface 1604, the camera 1606, the sensor 1607, the microphone 1608, the input apparatus 1609, the display apparatus 1610, the loudspeaker 1611, the wireless communication interface 1612, and the auxiliary controller 1619 are connected to each other via the bus 1617. The battery 1618 supplies power to blocks of the smartphone 1600 shown in FIG. 16 via a feeder, which is partially shown as a dotted line in the drawings. The auxiliary controller 1619, for example, operates a minimum necessary function of the smartphone 1600 in a sleep mode.

In the smartphone 1600 shown in FIG. 16, the angle measuring unit 1110 and the channel quality measuring unit 1130 described with reference to FIG. 11 may be implemented by the processor 1601 or the auxiliary controller 1619. At least a part of functions may be implemented by the processor 1601 or the auxiliary controller 1619. For example, the processor 1601 or the auxiliary controller 1619 may measure the angle of arrival of the downlink signal and measure the channel quality by executing instructions stored in the memory 1602 or the storage apparatus 1603.

Second Application Example

Figure 17:
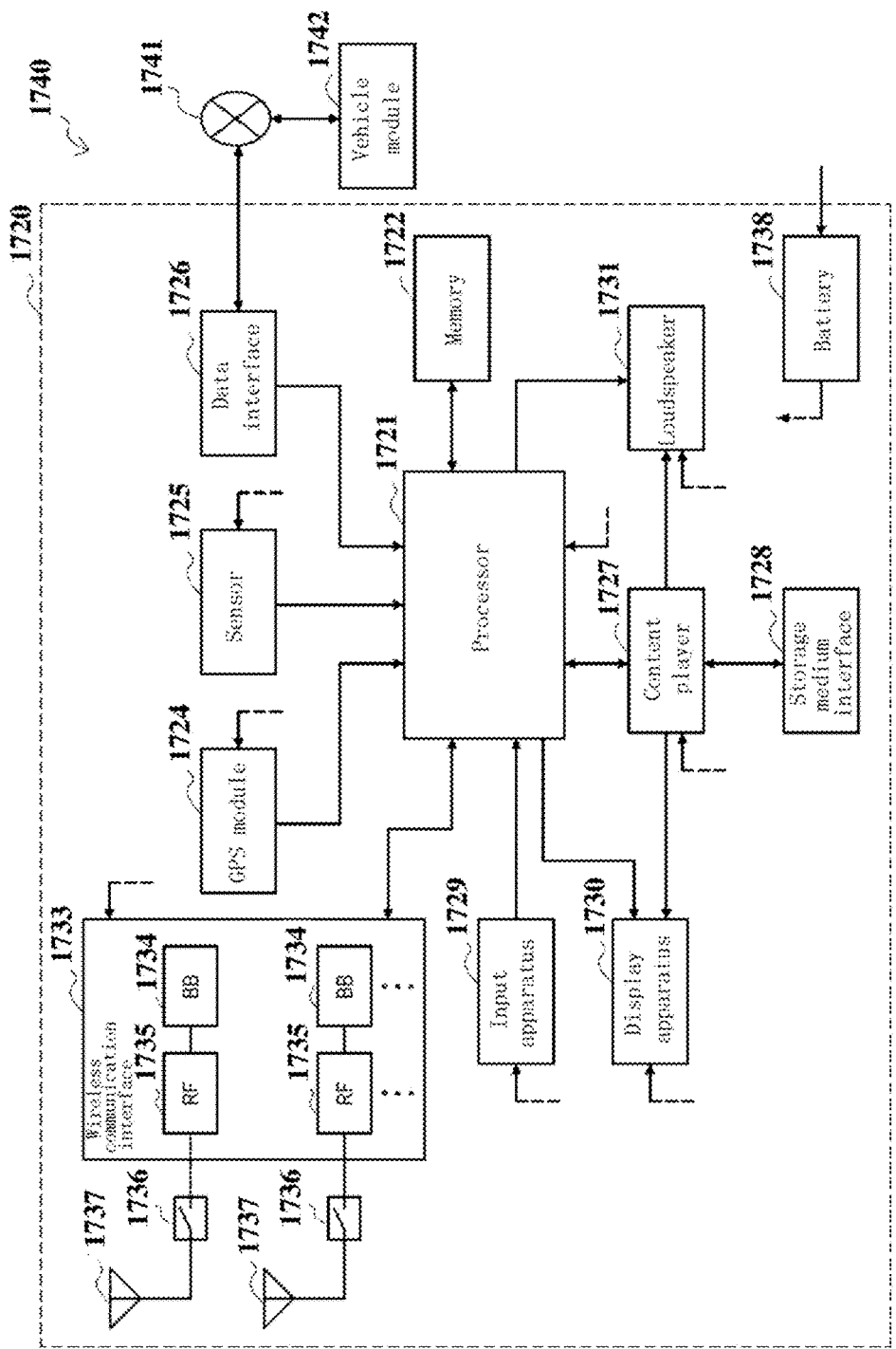
FIG. 17 is a block diagram showing an example of schematic configuration of a vehicle navigation equipment.

FIG. 17 is a block diagram showing an example of a schematic configuration of a vehicle navigation equipment 1720 to which the technology according to the present disclosure may be applied. The vehicle navigation equipment 1720 includes a processor 1721, a memory 1722, a global positioning system (GPS) module 1724, a sensor 1725, a data interface 1726, a content player 1727, a storage medium interface 1728, an input apparatus 1729, a display apparatus 1730, a loudspeaker 1731, a wireless communication interface 1733, one or more antenna switches 1736, one or more antennas 1737, and a battery 1738.

The processor 1721 may be, for example, a CPU or a SoC, and controls a navigation function and other functions of the vehicle navigation equipment 1720. The memory 1722 includes a RAM and a ROM, and stores data and a program executed by the processor 1721.

The GPS module 1724 uses a GPS signal received from a GPS satellite to measure a position (such as latitude, longitude, and altitude) of the vehicle navigation equipment 1720. The sensor 1725 may include a group of sensors, such as a gyro sensor, a geomagnetic sensor, and an air pressure sensor. The data interface 1726 is connected to, for example, a vehicle network 1741 via a terminal not shown, and acquires data (such as vehicle speed data) generated by the vehicle.

The content player 1727 reproduces content stored in a storage medium such as a CD and a DVD. The storage medium is inserted into the storage medium interface 1728. The input apparatus 1729 includes, for example, a touch sensor configured to detect a touch on a screen of the display apparatus 1730, a button, or a switch, and receives operation or information inputted from the user. The display apparatus 1730 includes a screen such as an LCD or OLED display, and displays an image of a navigation function or the reproduced content. The loudspeaker 1731 outputs sound of the navigation function or the reproduced content.

The wireless communication interface 1733 supports any cellular communication scheme (such as LTE and LTE-Advanced) and performs wireless communication. The wireless communication interface 1733 may generally include, for example, a BB processor 1734 and an RF circuitry 1735. The BB processor 1734 may perform, for example, encoding/decoding, modulating/demodulating, and multiplexing/demultiplexing, and perform various types of signal processing for wireless communication. Further, the RF circuitry 1735 may include, for example, a mixer, a filter, and an amplifier, and transmits and receives wireless signals via the antenna 1737. The wireless communication interface 1733 may also be a chip module on which the BB processor 1734 and the RF circuitry 1735 are integrated. As shown in FIG. 17, the wireless communication interface 1733 may include multiple BB processors 1734 and multiple RF circuitry 1735. Although FIG. 17 shows an example in which the wireless communication interface 1733 includes multiple BB processors 1734 and multiple RF circuitry 1735, the wireless communication interface 1733 may also include a single BB processor 1734 or a single RF circuitry 1735.

In addition to the cellular communication scheme, the wireless communication interface 1733 may support other type of wireless communication scheme, such as a short-range wireless communication scheme, a near-field communication scheme, and a wireless LAN scheme. In this case, the wireless communication interface 1733 may include a BB processor 1734 and an RF circuitry 1735 for each wireless communication scheme.

Each of the antenna switches 1736 switches a connection destination of the antenna 1737 among multiple circuitry (such as circuitry for different wireless communication schemes) included in the wireless communication interface 1733.

Each of the antennas 1737 includes a single antenna element or multiple antenna elements (such as multiple antenna elements included in a MIMO antenna), and is used for the wireless communication interface 1733 to transmit and receive wireless signals. As shown in FIG. 17, the vehicle navigation equipment 1720 may include multiple antennas 1737. Although FIG. 17 shows an example in which the vehicle navigation equipment 1720 includes multiple antennas 1737, the vehicle navigation equipment 1720 may also include a single antenna 1737.

In addition, the vehicle navigation equipment 1720 may include an antenna 2137 for each wireless communication scheme. In this case, the antenna switch 1736 may be omitted from the configuration of the vehicle navigation equipment 1720.

The battery 1738 supplies power to blocks of the vehicle navigation equipment 1720 shown in FIG. 17 via a feeder, which is partially shown as a dotted line in the drawings. The battery 1738 accumulates power supplied from a vehicle.

In the vehicle navigation equipment 1720 shown in FIG. 17, the angle measuring unit 1110 and the channel quality measuring unit 1130 described with reference to FIG. 11 may be implemented by the processor 1721. At least a part of functions may be implemented by the processor 1721. For example, the processor 1721 my measure the angle of arrival of the downlink channel and measure the channel quality by executing instructions stored in the memory 1722.

The technology according to the present disclosure may also be implemented as a vehicle system (or vehicle) 1740 including one or more blocks of the vehicle navigation equipment 1720, the vehicle network 1741, and a vehicle module 1742. The vehicle module 1742 generates vehicle data (such as vehicle speed, engine speed, and failure information), and outputs the generated data to the vehicle network 1741.

Preferred embodiments of the present disclosure are described above with reference to the drawings. However, the present disclosure is not limited to the above examples. Those skilled in the art may obtain various changes and modifications within the scope of the appended claims. It should be understood that these changes and modifications naturally fall within the technical scope of the present disclosure.

For example, a unit shown in a dashed box in the functional block diagram shown in the drawings indicates that the functional unit is optional in the corresponding apparatus, and optional functional units may be combined in an appropriate manner to achieve a required function.

For example, multiple functions included in one unit in the above embodiments may be implemented by separate apparatuses. Alternatively, multiple functions implemented by multiple units in the above embodiments may be implemented by separate apparatuses, respectively. In addition, one of the above functions may be implemented by multiple units. Such configuration should be included in the technical scope of the present disclosure.

In this specification, steps described in the flowchart include not only the processing performed in time series in the described order, but also processing performed in parallel or individually rather than necessarily in time series. In addition, the steps processed in time series may be performed in other appropriate order.

Although the embodiments of the present disclosure are described above in detail with reference to the drawings, it should be understood that the described embodiments are only used to illustrate the present disclosure rather than limit the present disclosure. For those skilled in the art, various changes and modifications may be made for the embodiments without departing from the essence and scope of the present disclosure. Therefore, the scope of the present disclosure is defined only by appended claims and equivalent meaning thereof.

The invention claimed is:

1. An electronic equipment arranged in a wireless communication system comprising a single base station equipment, the electronic equipment comprising processing circuitry configured to:
    estimate a distance between a network side equipment and a user equipment according to an angle of arrival of a downlink signal measured by the user equipment and an angle of arrival of an uplink signal measured by the network side equipment; and
    determine a position of the user equipment according to the distance between the network side equipment and the user equipment and the angle of arrival of the uplink signal,
    wherein the processing circuitry is further configured to:
    calculate the distance between the network side equipment and the user equipment according to an angle of transmission of the uplink signal, an angle of transmission of the downlink signal, the angle of arrival of the downlink signal and the angle of arrival of the uplink signal,
    calculate a first error between a direction of an uplink transmission beam and a direction of a direct path between the user equipment and the network side equipment according to the angle of transmission of the uplink signal and the angle of arrival of the downlink signal;
    calculate a second error between a direction of a downlink transmission beam and the direction of the direct path according to the angle of transmission of the downlink signal and the angle of arrival of the uplink signal; and
    calculate the distance between the network side equipment and the user equipment according to the first error and the second error.

2. The electronic equipment according to claim 1, wherein the processing circuitry is further configured to:
    calculate a downlink reception beamforming vector according to the angle of transmission of the uplink signal, calculate a response vector of a downlink channel matrix of the direct path according to the angle of arrival of the downlink signal, and calculate the first error according to the downlink reception beamforming vector and the response vector, the response vector representing a portion in the downlink channel matrix which is associated with the angle of arrival of the downlink signal; and
    calculate a downlink transmission beamforming vector according to the angle of transmission of the downlink signal, calculate a steering vector of the downlink channel matrix of the direct path according to the angle of arrival of the uplink signal, and calculate the second error according to the downlink transmission beamforming vector and the steering vector, the steering vector representing a portion in the downlink channel matrix which is associated with the angle of arrival of the uplink signal.

3. The electronic equipment according to claim 1, wherein the processing circuitry is further configured to:
    acquire a complex channel parameter of the direct path according to the first error and the second error; and
    calculate the distance between the network side equipment and the user equipment according to the complex channel parameter of the direct path.

4. The electronic equipment according to claim 3, wherein the processing circuitry is further configured to:
    calculate the distance between the network side equipment and the user equipment according to a phase difference between a plurality of complex channel parameters calculated by transmitting an uplink signal and a downlink signal a plurality of times.

5. The electronic equipment according to claim 1, wherein the processing circuitry is further configured to:
    select, from among a plurality of pairs of beams between the user equipment and the network side equipment, a pair of beams closest to the direct path as the uplink transmission beam and the downlink transmission beam.

6. The electronic equipment according to claim 5, wherein the processing circuitry is further configured to:
    select the pair of beams closest to the direct path according to a channel quality of each of the plurality of pairs of beams; and
    select, from the plurality of pairs of beams, a pair of beams with a channel quality greater than a channel quality threshold and being a best channel quality as the pair of beams closest to the direct path.

7. The electronic equipment according to claim 1, wherein the processing circuitry is further configured to:
    transmit a positioning instruction message to the user equipment, wherein the positioning instruction message comprises at least one of the following: a positioning start time, positioning duration, an uplink transmission beam for the user equipment, or a downlink transmission beam for the network side equipment.

8. The electronic equipment according to claim 1, wherein the electronic equipment serves as the network side equipment.

9. The electronic equipment according to claim 8, wherein the processing circuitry is further configured to:
    measure the angle of arrival of the uplink signal according to uplink signals received by different antennas of the network side equipment without generating a reception beam, when receiving the uplink signal from the user equipment.

10. A wireless communication method performed by an electronic equipment, comprising:
- calculating a distance between a network side equipment and a user equipment according to an angle of arrival of a downlink signal measured by the user equipment and an angle of arrival of an uplink signal measured by the network side equipment; and
- determining a position of the user equipment according to the distance between the network side equipment and the user equipment and the angle of arrival of the uplink signal;
- wherein the method further comprises:
- calculating the distance between the network side equipment and the user equipment according to an angle of transmission of the uplink signal, an angle of transmission of the downlink signal, the angle of arrival of the downlink signal and the angle of arrival of the uplink signal,
- calculating a first error between a direction of an uplink transmission beam and a direction of a direct path between the user equipment and the network side equipment according to the angle of transmission of the uplink signal and the angle of arrival of the downlink signal;
- calculating a second error between a direction of a downlink transmission beam and the direction of the direct path according to the angle of transmission of the downlink signal and the angle of arrival of the uplink signal; and
- calculating the distance between the network side equipment and the user equipment according to the first error and the second error.

* * * * *